(12) United States Patent
Tai et al.

(10) Patent No.: US 7,218,420 B1
(45) Date of Patent: May 15, 2007

(54) GRAY LEVEL HALFTONE PROCESSING

(75) Inventors: Hwai-Tzuu Tai, Rochester, NY (US); Yee S. Ng, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 570 days.

(21) Appl. No.: 09/629,993

(22) Filed: Aug. 1, 2000

(51) Int. Cl.
G06K 15/00 (2006.01)
H04N 1/40 (2006.01)
G06T 5/00 (2006.01)

(52) U.S. Cl. ............ 358/3.2; 358/3.06; 358/3.21; 358/3.24; 358/3.26; 358/3.27; 382/269

(58) Field of Classification Search ........... 358/1.9, 358/2.99, 3.01, 3.02, 3.06, 3.14, 3.2, 3.21, 358/3.24, 3.26, 3.27; 382/266, 269
See application file for complete search history.

(56) References Cited

U.S. PATENT DOCUMENTS

| | | | |
|---|---|---|---|
| 4,149,194 A | 4/1979 | Holladay | 358/283 |
| 4,185,304 A * | 1/1980 | Holladay | 358/3.2 |
| 4,987,498 A | 1/1991 | Shimazaki | 358/456 |
| 5,047,955 A | 9/1991 | Shope et al. | 364/519 |
| 5,053,887 A | 10/1991 | Thompson | |
| 5,140,431 A | 8/1992 | Cardillo | |
| 5,155,588 A | 10/1992 | Levien | 358/519 |
| 5,200,831 A * | 4/1993 | Tai | 358/3.14 |
| 5,291,311 A | 3/1994 | Miller | |
| 5,293,579 A | 3/1994 | Stockholm | 382/269 |
| 5,313,309 A | 5/1994 | Tai et al. | 358/3.21 |
| 5,365,348 A | 11/1994 | Drees et al. | |
| 5,396,584 A * | 3/1995 | Lee et al. | 345/589 |
| 5,450,531 A | 9/1995 | Ng et al. | 395/100 |

(Continued)

FOREIGN PATENT DOCUMENTS

DE 42 25 508 1/1992

(Continued)

OTHER PUBLICATIONS

"Gray Level Printing Method With Embedded Non-Uniformity Correction Using A Multi-Bit LED Printhead," Yee S. Ng; Hieu T. Pham; Hwai T. Tai; and Eric K. Zeise, Research and Technology Development, Office Imaging, Eastman Kodak Company, Rochester, NY.

(Continued)

Primary Examiner—David Moore
Assistant Examiner—James A. Thompson
(74) Attorney, Agent, or Firm—Justin D. Petruzzelli

(57) ABSTRACT

An image processing method and apparatus for generating a gray level rendered pixel value that has been subjected to a halftoning process. In the method and apparatus a gray level pixel value of the pixel to be rendered by the halftoning process is provided as one input to a lookup table. A coordinate value that is determined from a pixel location in the image of the pixel to be rendered by the halftoning process is also provided as a second input to the lookup table. The first and second inputs represent an address in the lookup table of a rendered halftone value for halftone rendering of the pixel having the input gray value and the pixel location in the image.

10 Claims, 31 Drawing Sheets

U.S. PATENT DOCUMENTS

| | | | | |
|---|---|---|---|---|
| 5,469,516 A | | 11/1995 | Kerz | 382/254 |
| 5,574,833 A | | 11/1996 | Yoshiaki | 358/1.9 |
| 5,581,372 A | * | 12/1996 | Kerz | 358/3.14 |
| 5,600,761 A | | 2/1997 | Ng et al. | 395/128 |
| 5,619,334 A | | 4/1997 | Adams et al. | 358/2.1 |
| 5,625,460 A | | 4/1997 | Tai | 358/3.14 |
| 5,638,188 A | * | 6/1997 | Moro et al. | 358/3.03 |
| 5,642,436 A | | 6/1997 | Kerz | 382/237 |
| 5,694,224 A | | 12/1997 | Tai | 358/455 |
| 5,701,505 A | | 12/1997 | Yamashita et al. | 395/800 |
| 5,703,971 A | | 12/1997 | Asimopoulos et al. | 382/282 |
| 5,710,824 A | | 1/1998 | Mongeon | 382/162 |
| 5,729,665 A | | 3/1998 | Gauthier | 395/117 |
| 5,731,823 A | | 3/1998 | Miller et al. | 347/5 |
| 5,740,338 A | | 4/1998 | Gauthier et al. | 395/116 |
| 5,742,405 A | * | 4/1998 | Spaulding et al. | 358/3.1 |
| 5,742,703 A | | 4/1998 | Lin et al. | 382/176 |
| 5,745,249 A | * | 4/1998 | Crean et al. | 358/3.06 |
| 5,754,708 A | | 5/1998 | Hayashi et al. | 382/266 |
| 5,760,914 A | | 6/1998 | Gauthier et al. | 358/298 |
| 5,790,282 A | | 8/1998 | Hayashi et al. | 358/520 |
| 5,818,975 A | | 10/1998 | Goodwin et al. | 382/274 |
| 5,832,301 A | | 11/1998 | Yamaguchi | 710/48 |
| 5,844,688 A | | 12/1998 | Shimizu et al. | 358/296 |
| 5,860,047 A | | 1/1999 | Hernandez | 399/181 |
| 5,867,142 A | | 2/1999 | Thieret | 345/611 |
| 5,872,899 A | | 2/1999 | Komatsu et al. | 395/109 |
| 5,886,797 A | * | 3/1999 | Shimura | 382/266 |
| 5,914,744 A | | 6/1999 | Ng | 347/237 |
| 5,917,956 A | | 6/1999 | Ohsawa et al. | 382/266 |
| 5,920,646 A | | 7/1999 | Kamon | 382/173 |
| 5,926,577 A | | 7/1999 | Kasahara et al. | 382/266 |
| 5,937,153 A | | 8/1999 | Gauthier | 395/117 |
| 5,956,157 A | * | 9/1999 | Tai | 358/3.24 |
| 5,974,171 A | | 10/1999 | Hayashi et al. | 382/162 |
| 6,020,897 A | | 2/2000 | Carlsen et al. | 345/629 |
| 6,021,256 A | | 2/2000 | Ng et al. | 395/109 |
| 6,072,907 A | | 6/2000 | Taylor et al. | 382/237 |
| 6,075,965 A | | 6/2000 | Tombs et al. | 399/308 |
| 6,088,130 A | | 7/2000 | Matsukubo | 358/447 |
| 6,091,862 A | | 7/2000 | Okisu | 382/300 |

FOREIGN PATENT DOCUMENTS

| | | |
|---|---|---|
| DE | 692 26 574 | 4/1999 |
| EP | 0 881 822 | 2/1998 |
| EP | 0 520 774 | 8/1998 |
| JP | 10-145617 | 5/1998 |
| JP | 10-191082 | 7/1998 |
| JP | 10-233933 | 9/1998 |
| JP | 11-252388 | 9/1999 |
| JP | 2001-186369 | 7/2001 |

OTHER PUBLICATIONS

Lexikon DER Computergrafik Und Bildverarbeitung, by Alfred Iwainsky, Wolfgang Wilhelmi.

DE Search Report for 101 37 211.6.

Digital Document Processing by H.S. Hou, Ph.D., Xerox Corporation, John Wiley & Sons, pp. 99-106, 1983.

* cited by examiner

FIG. 7a (PLANE=255): 40×16 grid of 255 values, with one value circled.

FIG. 7b (PLANE=128): matrix of varied values with one 0 circled.

PLANE=2

| 0 | 0 | 0 | 0 | 0 | 0 | 0 | 3 |
| --- | --- | --- | --- | --- | --- | --- | --- |
| 0 | 0 | 1 | 0 | 0 | 0 | 0 | 0 |
| 0 | 0 | 0 | 0 | 0 | 0 | 62 | 16 |
| 0 | 20 | 0 | 0 | 49 | 2 | 0 | 0 |
| 18 | 23 | 0 | 11 | 19 | 0 | 0 | 0 |
| 65 | 0 | 0 | 12 | 0 | 0 | 0 | 0 |
| 0 | 0 | 0 | 0 | 0 | 0 | 0 | 0 |
| 0 | 0 | 0 | 0 | 0 | 20 | 0 | 0 |
| 1 | 0 | 0 | 0 | 46 | 1 | 0 | 44 |
| 1 | 0 | 32 | 18 | 0 | 0 | 2 | 1 |
| 0 | 0 | 5 | 36 | 0 | 0 | 1 | 0 |
| 0 | 0 | 18 | 0 | 0 | 0 | 0 | 9 |
| 0 | 0 | 0 | 0 | 0 | 0 | 0 | 33 |
| 0 | 0 | 0 | 15 | 0 | 0 | 80 | 0 |
| 0 | 0 | 30 | 6 | 0 | 33 | 3 | 0 |
| 0 | 15 | 34 | 0 | 2 | 12 | 0 | 0 |
| 0 | 52 | 0 | 0 | 2 | 0 | 0 | 0 |
| 23 | 0 | 0 | 0 | 0 | 0 | 1 | 0 |
| 1 | 0 | 0 | 0 | 0 | 41 | 0 | 0 |
| 0 | 10 | 0 | 0 | 60 | 1 | 0 | 0 |
| 51 | 14 | 11 | 0 | 22 | 23 | 0 | 0 |
| 51 | 0 | 1 | 24 | 0 | 0 | 0 | 0 |
| 0 | 0 | 2 | 0 | 0 | 0 | 0 | 0 |
| 0 | 0 | 0 | 2 | 0 | 0 | 0 | 0 |
| 0 | 0 | 0 | 31 | 0 | 0 | 0 | 65 |
| 0 | 0 | 39 | 12 | 0 | 0 | 17 | 2 |
| 0 | 0 | 10 | 44 | 0 | 0 | 6 | 0 |
| 0 | 0 | 35 | 0 | 0 | 0 | 0 | 4 |

STEP 1

TILE STRUCTURE

| X | X | X | X | X | X | X |
|---|---|---|---|---|---|---|
| X | X | X | C1 | X | X | X |
| X | X | C1 | C1 | C1 | X | X |
| X | C1 | C1 | C1 | C1 | C1 | X |
| X | C1 | C1 | C1 | C1 | C1 | X |
| X | X | C1 | C1 | C1 | X | X |
| X | X | X | C1 | X | X | X |
| X | X | X | X | X | X | X |

*FIG. 21-1*

STEP 2

LABEL PIXEL SEQUENCE
IN THE TILE

| 0 | 0 | 0 | 0 | 0 | 0 | 0 |
|---|---|---|---|---|---|---|
| 0 | 0 | 0 | 1 | 0 | 0 | 0 |
| 0 | 0 | 2 | 3 | 4 | 0 | 0 |
| 0 | 5 | 6 | 7 | 8 | 9 | 0 |
| 0 | 10 | 11 | 12 | 13 | 14 | 0 |
| 0 | 0 | 15 | 16 | 17 | 0 | 0 |
| 0 | 0 | 0 | 18 | 0 | 0 | 0 |
| 0 | 0 | 0 | 0 | 0 | 0 | 0 |

STEP 3  FILL UP IMAGE PLANE WITH TILE

STEP 4   FOUND REPEATING RECTANGLE
         BLOCKS IN THE IMAGE PLANE

| 1  | 10 | 11 | 12 | 13 | 14 | 1  | 10 | 11 | 12 | 13 | 14 | 1  |
| 3  | 4  | 15 | 16 | 17 | 2  | 3  | 4  | 15 | 16 | 17 | 2  | 3  |
| 7  | 8  | 9  | 18 | 5  | 6  | 7  | 8  | 9  | 18 | 5  | 6  | 7  |
| 12 | 13 | 14 | 1  | 10 | 11 | 12 | 13 | 14 | 1  | 10 | 11 | 12 |
| 16 | 17 | 2  | 3  | 4  | 15 | 16 | 17 | 2  | 3  | 4  | 15 | 16 |
| 18 | 5  | 6  | 7  | 8  | 9  | 18 | 5  | 6  | 7  | 8  | 9  | 18 |
| 1  | 10 | 11 | 12 | 13 | 14 | 1  | 10 | 11 | 12 | 13 | 14 | 1  |
| 3  | 4  | 15 | 16 | 17 | 2  | 3  | 4  | 15 | 16 | 17 | 2  | 3  |
| 7  | 8  | 9  | 18 | 5  | 6  | 7  | 8  | 9  | 18 | 5  | 6  | 7  |
| 12 | 13 | 14 | 1  | 10 | 11 | 12 | 13 | 14 | 1  | 10 | 11 | 12 |
| 16 | 17 | 2  | 3  | 4  | 15 | 16 | 17 | 2  | 3  | 4  | 15 | 16 |
| 18 | 5  | 6  | 7  | 8  | 9  | 18 | 5  | 6  | 7  | 8  | 9  | 18 |
| 1  | 10 | 11 | 12 | 13 | 14 | 1  | 10 | 11 | 12 | 13 | 14 | 1  |
| 3  | 4  | 15 | 16 | 17 | 2  | 3  | 4  | 15 | 16 | 17 | 2  | 3  |
| 7  | 8  | 9  | 18 | 5  | 6  | 7  | 8  | 9  | 18 | 5  | 6  | 7  |
| 12 | 13 | 14 | 1  | 10 | 11 | 12 | 13 | 14 | 1  | 10 | 11 | 12 |
| 16 | 17 | 2  | 3  | 4  | 15 | 16 | 17 | 2  | 3  | 4  | 15 | 16 |

STEP 5

BRICK STRUCTURE FORMED

BRICK WIDTH = 6 = Bw
BRICK HEIGHT = 3 = Bh
BRICK OFFSET = 3 = Bs

STEP 6

LEVEL 0

CONVERTS 3-D LUT
TILE STRUCTURE TO
3-D LUT BRICK
STRUCTURE

LEVEL 2
| 106 | 0 | 0 | 0 | 0 | 0 |
|---|---|---|---|---|---|
| 0 | 0 | 0 | 0 | 0 | 0 |
| 0 | 0 | 0 | 0 | 0 | 0 |

LEVEL 128
| 255 | 231 | 0 | 0 | 0 | 231 |
|---|---|---|---|---|---|
| 255 | 231 | 0 | 0 | 0 | 231 |
| 220 | 99 | 99 | 220 | 100 | 100 |

LEVEL 255
| 255 | 255 | 255 | 255 | 255 | 255 |
|---|---|---|---|---|---|
| 255 | 255 | 255 | 255 | 255 | 255 |
| 255 | 255 | 255 | 255 | 255 | 255 |

*FIG. 21-6*

TILE STRUCTURE

| C1 | C1 | C1 | C1 | C2 | C2 | C2 |
|----|----|----|----|----|----|----|
| C1 | C1 | C1 | C1 | C2 | C2 | C2 |
| C1 | C1 | C1 | C1 | C2 | C2 | C2 |
| C3 | C3 | C3 | C4 | C2 | C2 | C2 |
| C3 | C3 | C3 | C4 | C4 | C4 | C4 |
| C3 | C3 | C3 | C4 | C4 | C4 | C4 |
| C3 | C3 | C3 | C4 | C4 | C4 | C4 |

BRICK STRUCTURE

| S1 | E1 | S1 | E1 |
|----|----|----|----|
| S2 | E2 | S2 | E2 |
| S3 | E3 | S3 | E3 |
| S4 | E4 | S4 | E4 |
| S5 | E5 | S5 | E5 |
| S6 | E6 | S6 | E6 |
| S7 | E7 | S7 | E7 |
| S1 | E1 | S1 | E1 |
| S2 | E2 | S2 | E2 |
| S3 | E3 | S3 | E3 |
| S4 | E4 | S4 | E4 |
| S5 | E5 | S5 | E5 |
| S6 | E6 | S6 | E6 |
| S7 | E7 | S7 | E7 |

*FIG. 23a*

GRAY LEVEL = 2

| 0 | 0 | 0 | 0 | 0 | 0 | 0 |
|---|---|---|---|---|---|---|
| 0 | 31 | 18 | 0 | 7 | 42 | 0 |
| 0 | 15 | 8 | 0 | 3 | 20 | 0 |
| 0 | 0 | 0 | 0 | 0 | 0 | 0 |
| 0 | 8 | 5 | 0 | 2 | 11 | 0 |
| 0 | 38 | 21 | 0 | 8 | 51 | 0 |
| 0 | 0 | 0 | 0 | 0 | 0 | 0 |

BRICK STRUCTURE

| 0 | 0 | 0 | 0 | 0 | 0 | 0 |
|---|---|---|---|---|---|---|
| 0 | 31 | 18 | 0 | 7 | 42 | 0 |
| 0 | 15 | 8 | 0 | 3 | 20 | 0 |
| 0 | 0 | 0 | 0 | 0 | 0 | 0 |
| 0 | 8 | 5 | 0 | 2 | 11 | 0 |
| 0 | 38 | 21 | 0 | 8 | 51 | 0 |
| 0 | 0 | 0 | 0 | 0 | 0 | 0 |

*FIG. 23b*

GRAY LEVEL = 128

| 20 | 164 | 83 | 5 | 83 | 164 | 20 |
|----|-----|-----|-----|-----|-----|-----|
| 164 | 255 | 229 | 132 | 223 | 255 | 164 |
| 83 | 229 | 163 | 51 | 159 | 233 | 83 |
| 5 | 132 | 51 | 0 | 51 | 132 | 5 |
| 83 | 223 | 159 | 51 | 158 | 224 | 83 |
| 164 | 255 | 233 | 132 | 224 | 255 | 164 |
| 20 | 164 | 83 | 5 | 83 | 164 | 20 |

BRICK STRUCTURE

| 20 | 164 | 83 | 5 | 83 | 164 | 20 |
|----|-----|-----|-----|-----|-----|-----|
| 164 | 255 | 229 | 132 | 223 | 255 | 164 |
| 83 | 229 | 163 | 51 | 159 | 233 | 83 |
| 5 | 132 | 51 | 0 | 51 | 132 | 5 |
| 83 | 223 | 159 | 51 | 158 | 224 | 83 |
| 164 | 255 | 233 | 132 | 224 | 255 | 164 |
| 20 | 164 | 83 | 5 | 83 | 164 | 20 |

*FIG. 23c*

GRAY LEVEL HALFTONE PROCESSING

CROSS-REFERENCE TO RELATED APPLICATIONS

This application is related to the following applications filed on even date herewith:

1. U.S. patent application Ser. No. 09/629,696, filed in the names of Yee S. Ng et al, and entitled EDGE ENHANCEMENT OF GRAY LEVEL IMAGES.

2. U.S. patent application Ser. No. 09/629,994, filed in the names of Yee S. Ng et al., and entitled EDGE ENHANCEMENT PROCESSOR AND METHOD WITH ADJUSTABLE STRENGTH OF GRAY LEVEL OUTPUT.

3. U.S. patent application Ser. No. 09/628,397, filed in the names of Yee S. Ng et al, and entitled EDGE ENHANCEMENT PROCESSOR AND METHOD WITH ADJUSTABLE THRESHOLD SETTING.

4. U.S. patent application Ser. No. 09/630,435, filed in the names of Hwai-Tzuu Tai et al, and entitled IMAGE RECORDING APPARATUS AND METHOD PROVIDING PERSONALIZED COLOR ENHANCEMENT.

BACKGROUND OF THE INVENTION

1. Field of the Invention

The invention relates generally to digital image processing and, more specifically, to a digital image processing system and method for forming halftone images using gray level image data.

2. Description Relative to the Prior Art

In the prior art, as represented by U.S. Pat. No. 5,694,224, it is known to form halftone images using gray level image data. As used herein, the term "gray level image data" refers to pixel image data whose gray level must be represented by more than one digital bit. While it is known in some systems to represent an on or off or black or white binary pixel by more than one digital bit, such representation is unnecessary but only done as a convenience for the particular hardware structure. With the gray level pixels referred to herein the gray levels, whether they be in terms of density or size, must be defined in terms of more than one digital bit and, thus, such pixels are described in varying shades of gray from either no density to maximum density and at least one shade therebetween. For example, where the gray level of a pixel is represented by a bit depth of four bits it is possible to define 15 levels of gray plus background or no color. With a bit depth of eight bits it is possible to define 255 levels of gray plus background or no color. It will be understood, of course, that colors other than gray are also contemplated as will be understood from the description below.

The above referred to prior art discloses the use of a halftoning process wherein cells or groups of gray level pixels are used to form different densities of halftone dots in accordance with various growth patterns for production of said halftone dots. In a typical color image forming process various color separation images of the color image are processed separately and subjected to a halftoning process before combining the individual color separation images in superposed registered form for example onto a receiver sheet or a display. In order to reduce the formation of artifacts such as moire artifacts in a color image, it is well known to provide some form of rotation of the various color separation screen images. Because of the nature of the rotation of the screens and differences in the colors, the processing of the respective color separation image data is more advantageously processed separately. In processing the respective image data for the respective color separations it has heretofore been known to subject each gray level pixel to a threshold comparison to determine a halftone rendering value for rendering the current pixel in accordance with the halftoning process. In accordance with the invention, there is provided a direct lookup table method and apparatus for determining a rendered gray level halftone pixel.

The invention and its further objects and advantages will become more apparent from a discussion of the preferred embodiments of the invention.

SUMMARY OF THE INVENTION

In accordance with a first aspect of the invention there is provided an image processing method for generating a gray level rendered pixel value that has been subjected to a halftoning process, the method comprising: providing a gray level pixel value of the pixel to be rendered by the halftoning process; providing a coordinate value that is determined from a pixel location of the pixel to be rendered by the halftoning process; establishing an input to a lookup table that includes as an address the gray level pixel value of the pixel to be rendered and the coordinate value; and outputting from the lookup table a gray level rendered pixel value representing rendering by the halftoning process.

In accordance with a second aspect of the invention there is provided an image processing system for generating a gray level rendered pixel value that has been subject to a halftoning process, the system comprising: a lookup table storing gray level pixel values representing rendered values of a halftoning process; and an input to the lookup table providing a coordinate value of a current pixel to be rendered and a gray level of the pixel to be rendered.

The invention and its further objects and advantages will become more apparent after reading the detailed description of the preferred embodiments presented below.

BRIEF DESCRIPTION OF THE DRAWINGS

In the detailed description of the preferred embodiments of the invention presented below, reference is made to the accompanying drawings in which:

FIGS. 7 (a), (b) and (c) and 8 are illustrative examples of screen address "bricks" and lookup table respectively that are used to generate halftone screen pixel rendered values for the pictorial screen of FIGS. 6 (a), (b) and (c);

FIG. 15 illustrates schematically a binary image that is provided with gray level edge enhancement in accordance with output from a medium strength setting for a lookup table;

FIG. 16 illustrates schematically a binary image that is provided with gray level edge enhancement in accordance with output from a low strength setting for a lookup table;

FIGS. 21-1 to 21-6 represent an illustration of steps for forming a brick structure;

FIGS. 23 (*a*)-(*c*) are illustrations of a tile structure and respective brick structures for a screen having 171 lines per inch at 0 degrees rotation angle.

DETAILED DESCRIPTION OF THE
PREFERRED EMBODIMENTS

Figure 1:
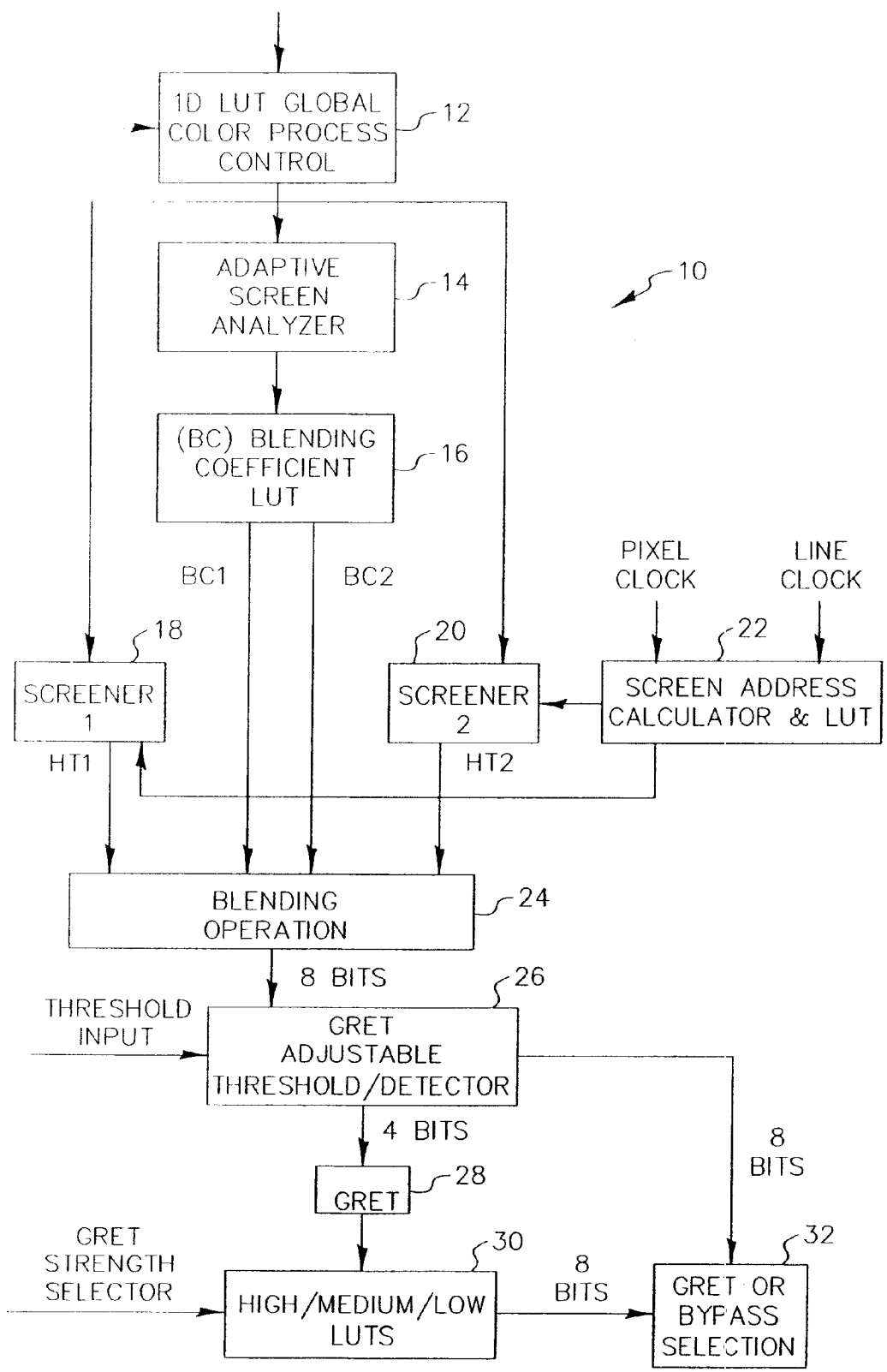
FIG. 1 is a schematic block diagram of an image processing system according to the invention.

The method described herein is intended for a full process color system that has multiple color separations, however the invention described is also applicable to black and white and accent color systems. There is herein described, for clarity purposes, a method and apparatus for processing image data for only one of the color separations of a plural process color separation image forming system. Extension to all color separations is an obvious matter such as by providing additional or parallel systems for each color or processing different colors serially. The input image to the system is assumed to be a continuous-tone color separation (post-RIP rasterized image) after GCR (Gray Component Replacement) and UCR (Under Color Removal) processings have already been applied. The input image data is gray level image data that may have been derived from scanning of a document by a scanner. In FIG. 1, there is shown a schematic of an image processing system according to the invention. A 1-D (one dimensional) look-up table (LUT) 12 or global color process control (re-programmable) is used to operate on the input data so as to enable last-minute customer desired personalization or preference to affect the color separation coloring of the already rasterized image (such as redder, greener, etc.) during the real-time running of the printing system. The modified input data as output by the LUT 12 is then input to and analyzed by an adaptive screen analyzer unit 14 (image segmentation) to generate an image type identification function (in this case, contrast index). This contrast index acts as a pointer to obtain blending coefficients (BC 1, BC 2) for the halftone screens of choice. In this example, it is assumed that there are only two screens being used simultaneously (the text screen and a pictorial screen). It is understood that more intermediate screens can be used see in this regard U.S. Pat. No. 5,956,157 the contents of which are incorporated herein by reference. In this example contrast index is one known method of using the basic concept of image segmentation and fuzzy logic approach to assign the percentage of usage of certain screens of choice.

The modified input contone data is also passed to the two screener or LUTs 18, 20 for halftone processing at the same time. In each of the screener LUT blocks, it is assumed that the input contone data is halftoned by only that screener (such as a very high frequency soft screen for text) under the control of a screening address calculator 22 that has input from the pixel clock and line clock. A halftone rendered value is the output from each of the screening blocks 18, 20. In the case of rational screens, the repeating calculated address of the halftone blocks for the two screen choices are not necessarily the same. Then a blending operation is done in processor 24 that takes the blending coefficients and the halftone values of all the screens into consideration so a blended rendered halftone value (blended halftoned value) based on the result comes out. Since the edges of non-saturated text/graphics have a high likelihood to use mostly the high frequency soft pictorial screen (which employs a partial-dot the growth pattern) and while the interior of the larger text has a higher likelihood to use mostly the lower frequency (mixed-dot growth pattern) screen, fine details are preserved and the large area EP stability is achieved at the same time. Moreover, since the edges of non-saturated text are using higher frequency screens, it does not get degraded by normal lower frequency screen processing (it is almost like an anti-aliasing effect is done for non-saturated text and graphics). The blending of screens also reduces the artifacts at the boundary of image types. This also reduces the moire problem caused by scanning input images that have high frequency features and output with a fixed screen (screen angle, screen frequency) halftone screens.

As noted in U.S. Pat. No. 5,694,224 in gray level printing, each pixel has the capability to be rendered in several different dot sizes or densities, and thus different gray levels. The number of gray levels is at least three whereas in a binary system only two levels are possible, background and highest density. However instead of simply providing each pixel with an independent gray level, several pixels may be organized together to form a super pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone levels for a cell is increased greatly, however, due to the number of different gray levels available for each pixel. For example, instead of only the two levels provided in binary halftoning for each pixel, 256 levels (including zero) can be provided with gray level printing for each pixel in the cell. The formation of the dots in the pixels of the cell can be performed in a number of different manners to achieve different desired results. The dots can be formed as "full" dot, "partial" dot, "mixed" dot or fixed dot to provide gray level halftoning. The partial dot formation process and mixed dot formation process are described in the aforementioned U.S. Pat. No. 5,694,224.

Up to this point, the system can produce an anti-aliasing effect for non-saturated text and reduce moire caused by beating of the output screen to an input, and at the same time maintain stability for the EP process. The system also needs to produce an anti-aliasing effect for saturated text. Further, for color systems, since GCR and UCR are often used; some of the originally saturated text (in monochrome) has been changed to near-saturated text. In order to resolve this problem, a programmable adjustable threshold/detector 26 is used on the blended halftoned data (see FIG. 1). Thus blended gray level halftone values beyond a certain threshold are each converted, by GRET adjustable threshold/detector 26, into a binary 1 value and the rest are set to a binary 0 value before they are input to the GRET anti-aliasing detector 28. In this regard reference is made to U.S. Pat. Nos. 5,450,531 and 5,600,761 the contents of which are incorporated herein by reference for disclosure of GRET processing although other gray level edge enhancement processors may be used for improving edges of saturated text. Anti-aliasing edge enhancement output suggestions from GRET set the pointers to an LUT that contains multiple level output values to smooth the edges. Different strength (gray values) LUTs can be provided for the purpose of providing more or less smoothing or line-width control as shown in FIG. 1. This particular GRET strength selection being made by an input to LUT 30. Of course, based on the GRET algorithm for multiple level images, the detector 26 would also determine whether there are other values than the binary (a high but not saturated value and/or a low value) that exists within the window of examination. If there are other gray values within that window, the bypass gray values (blended halftoned values as output by blending operation processor 24) will be used instead. In this regard it will be noted that the GRET adjustable threshold/detector 26 provides additionally a bypass of the GRET processor 28 of the output of the blending operation processor 24. In addition to the bypass data a selector signal is provided as an input to the GRET or bypass selection device 32 so that the selection device 32 can determine whether to pass the GRET processed data as modified by GRET strength selector 30 or the bypass data which represents the blended halftoned data output by blending operation processor 24. There is thus accomplished anti-aliasing for near-saturated text/graphics in addition to the improvement in quality for non-saturated text as well in the method and apparatus of the invention.

Figure 2:
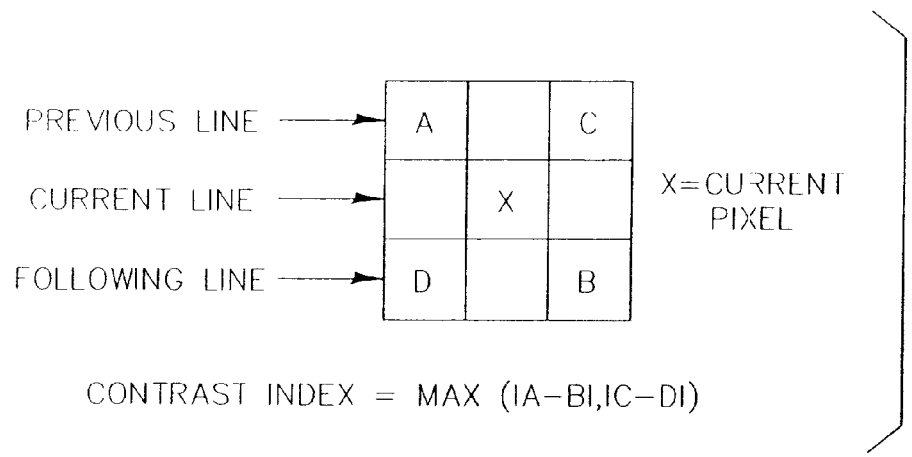
FIG. 2 is an illustration of a window of nine pixels and illustrates one exemplary approach to determining contrast index.

In FIG. 2 there is illustrated a method to calculate the contrast index (that is the method used by the adaptive screen analyzer 14). In this method a window of nine pixels (which is taken from the output of global color process control device 12) is used and the absolute value differences between certain neighboring pixels are examined to determine a maximum difference between a pair of neighboring pixels. In this regard reference may be made to U.S. Pat. No. 5,956,157.

Figure 3:
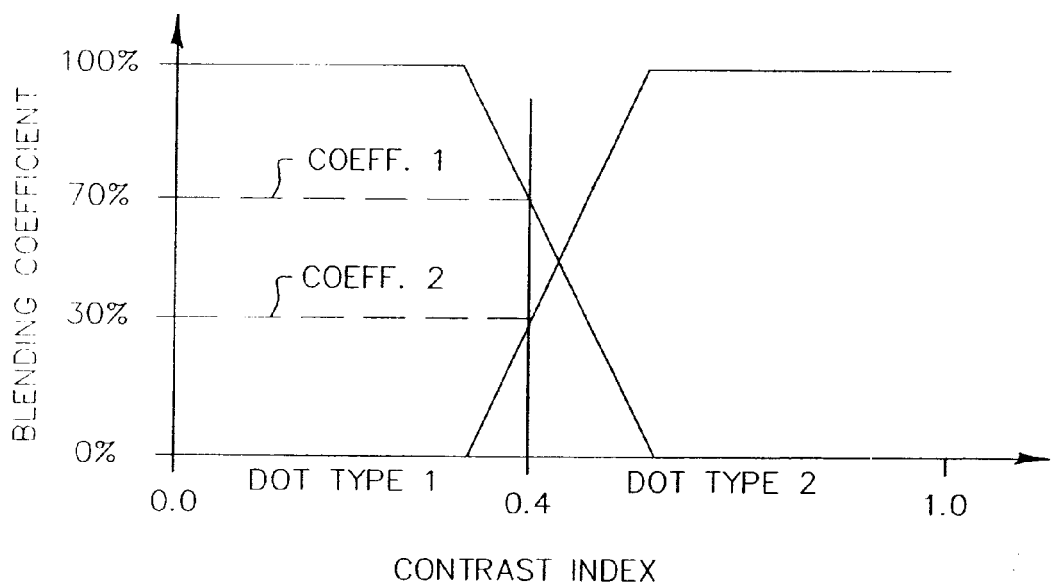
FIG. 3 is a view illustrating a determination of a blended rendered dot value using a graph depicting blending coefficients vs. contrast index for each of two different halftone processings.

In FIG. 3, there is shown an example of how the blending coefficients (BC 1, BC 2) are calculated (100 percent equal 1) in a two screener fuzzy logic system with the contrast index. There is also indicated an example of how the blended halftone value (rendered value) is calculated from the blending coefficients and halftone dot gray values of different halftone screen look-up tables outputs.

The current system offers independent tuning of the multi-level outputs within the LUTs from the two halftone screens and the GRET LUT edge values. It is desirable to match the two halftone screens gray levels and screen structure. In this regard there is provided a match of density and structure at the boundary region between image types, so the gray values within the two screener LUTs are tuned to achieve this match namely, at a similar input value, the output densities (not necessarily the same gray output values, since the screens are different) of the two screens are selected to match well (of course the screen structures of the two screens are also selected to reduce texture mismatch), so that a gradual transition between image type regions can be accomplished. For a similar reason, the gray values and GRET LUTs (high/medium/low-the high, medium, low refers to different degrees of aggressiveness in terms of anti-aliasing) are tuned independently from the screener LUT values in order to give an optimized performance for near-saturated text anti-aliasing effect (depending upon customer choice). The current system described herein provides the independent means for all of that to be done.

Preference Color Saturation Tweaking

Figure 18:
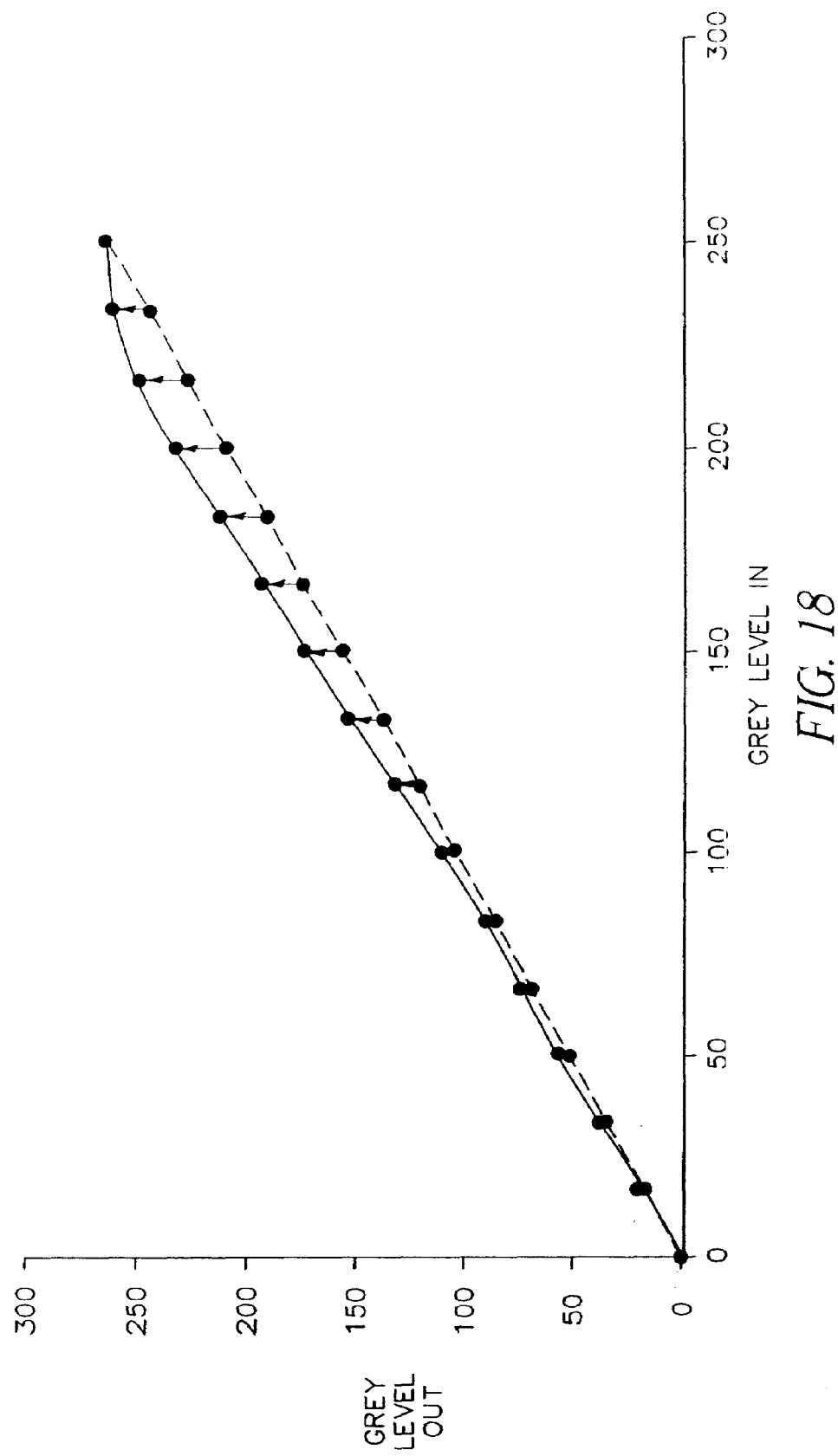
FIG. 18 is a graph showing a relationship of input pixel gray values to modified gray values in accordance with color saturation tweaking.
Figure 19:
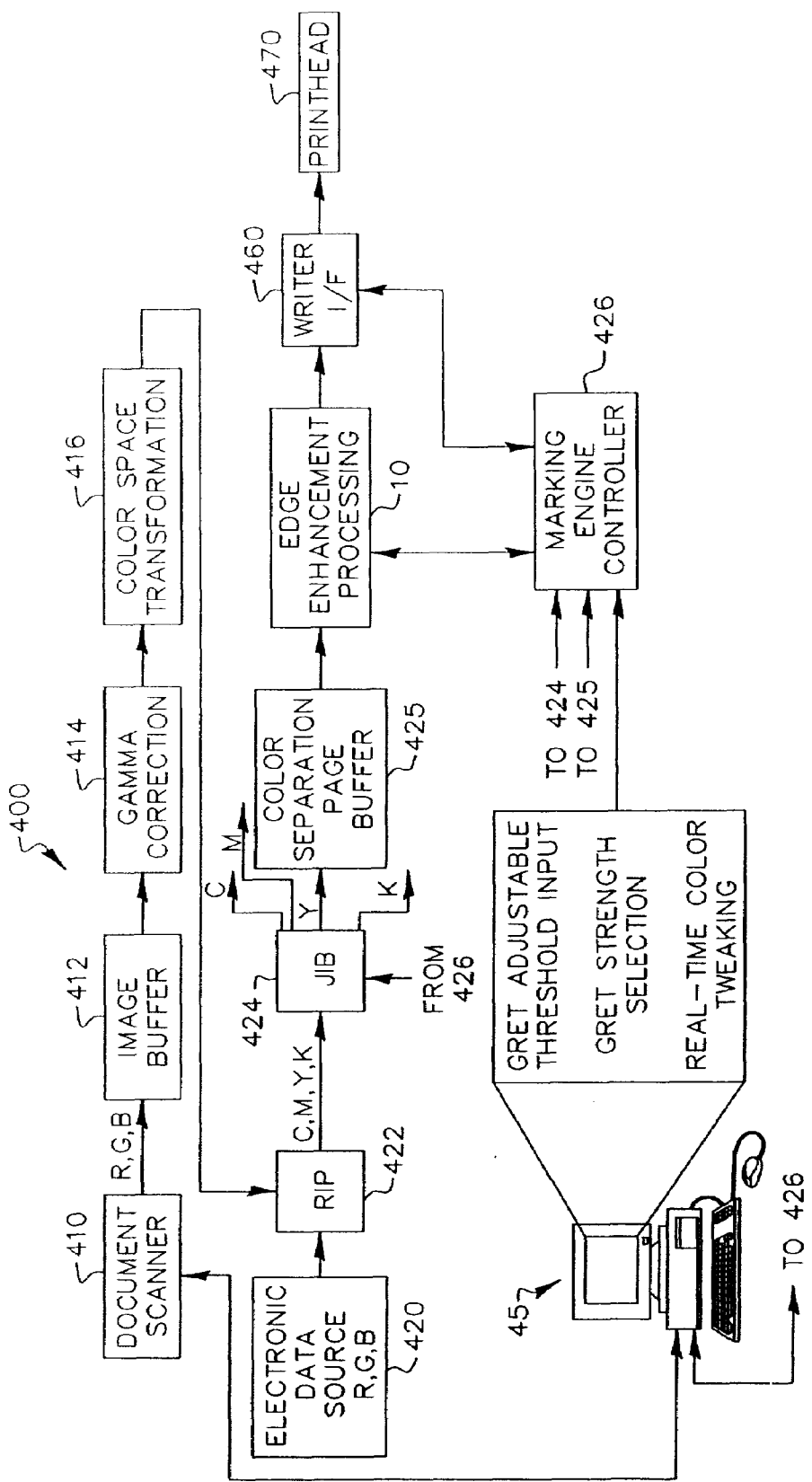
FIG. 19 is a block diagram of a printing or display system that incorporates the image processing system of FIG. 1.

A 1D (one dimensional) global color process control LUT 12 is used at the beginning to ensure the possibility of last-minute tuning of preference color even during the running of the printer after the images have already been RIPed (raster image processed). One input to LUT 12 is the 8 bit input data for the color separation image. The second input to LUT 12 is a color tweaking value for adjusting saturation of the color separation image. As shown in FIG. 18 there is provided a schematic illustrating the gray level input into LUT 12 and the corresponding gray level output from LUT 12 and the range of adjustments possible by modifying the color saturation on the output by the operator providing a color tweaking adjustment input that is available at the control panel of the workstation WS in FIG. 19. It will be noted that this input comes after the job image buffer and is effectively modifying image data after the image data is output from the job-image buffer. Thus experimentation may be done by the operator in making copies (such as proof copies) with various tweaking adjustments without rescanning of original hardcopy documents or rerasterizing of the image data when the data is presented in electronic form as indicated in blocks 424 and 425 in FIG. 19. The job image buffer, JIB (424) buffers many ripped and compressed color separation files (C,M,Y,K), and pass a separation file page to the color separation page buffer (425) which decompresses the compressed image data and stores the page separation file for further processing, including real-time global color tweaking (see FIG. 1) based on last minute customer preference information from the WS. The yellow color separation page buffer and subsequent processing is shown in FIG. 19 explicitly. The other equivalent color separation page buffers and subsequent processing for C, M and K channels are implied in FIG. 19. Preference color tweaking provides the last step of minor color adjustment to allow a user to adjust color if the user doesn't like the color being printed as may be observed from a proof print. Thus a de-saturated color may be adjusted back to a more saturated color. There may be provided the boosting of a specific color in the image. The coloring is not intended to provide fine-tuning of each color to be color accurate or to match color as a known color management process may be provided in a front end portion of the machine prior to rasterization. For full color or process color processes (cyan, magenta, yellow and optionally black) color tweaking is preferably performed before halftone processing because there are improved results obtained by modifying the contone (continuous tone) data rather than the halftone processed data. An advantage of having adjustments be provided to the contone data is that modifications to a dot structure or dot data formed after a halftone process may introduce unwanted artifacts (interaction from other color channels) in the dot structure and tends to provide more color variations or at least tends to be more difficult to predict/control adjustment of color.

In order to handle some limited degree of GCR/UCR ranges, an adjustable GRET threshold step is also provided at threshold detector 26 for different degrees of near-saturated text and graphics anti-aliasing needs. Other enhancements include putting more than one of the pictorial screens within the screener 2 (screener 20) LUTs so different pictorial screens can be selected within one printed page without a need to reload the LUT (of course the screen address calculator's screen positioning increment calculation would need to be changed from one pictorial screen to the other). Further improvements include using more than two screens at a time in the blending operations for smoother transitions.

Figure 4:
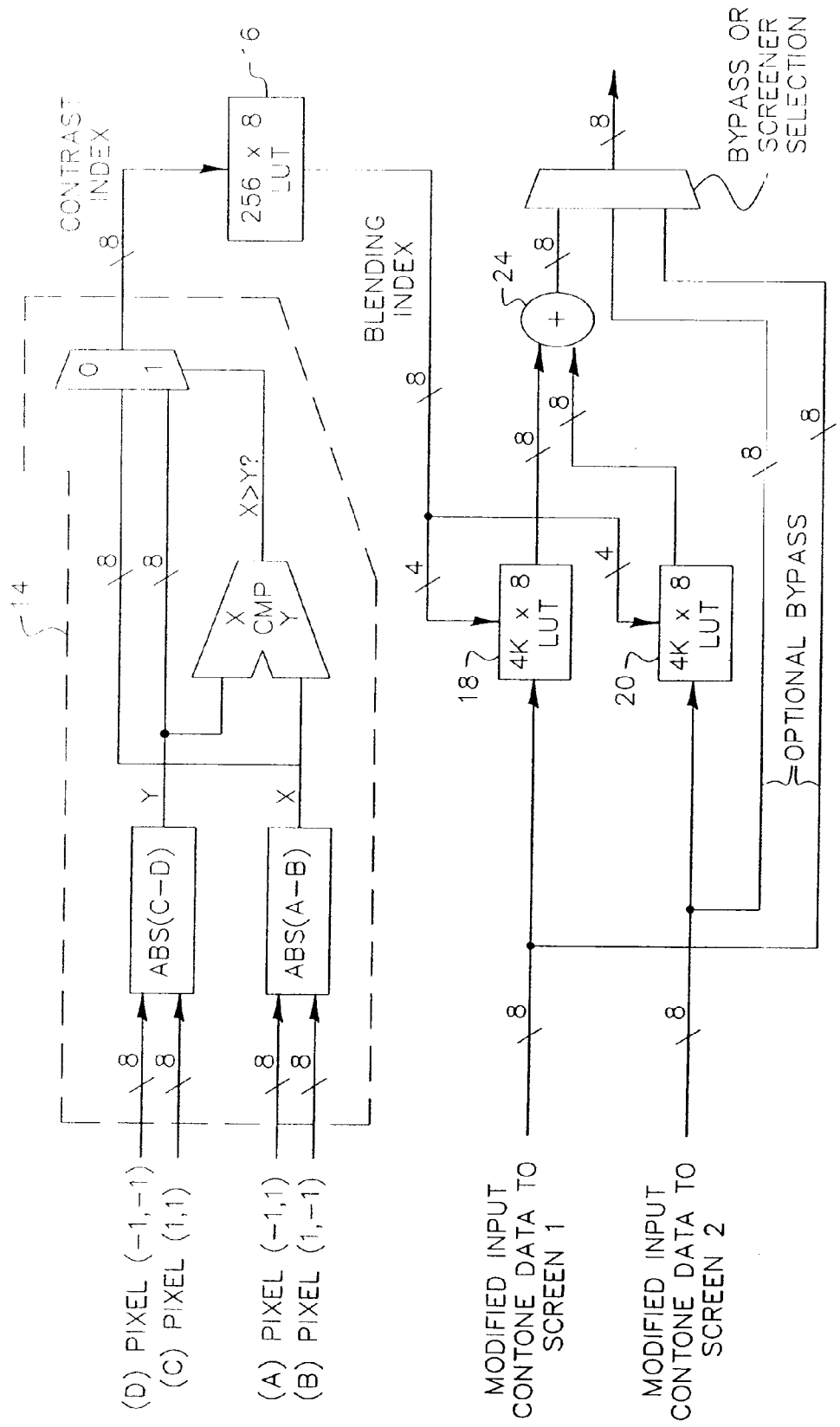
FIG. 4 is a block diagram showing greater detail of a portion of the system of FIG. 1.

In FIG. 4, there is shown a detailed implementation of the functions such as the adaptive screen analyzer 14 (that generates the contrast index, please see FIG. 2 for its functional description), the blending coefficients LUT 16 (please see FIG. 3 for its functional description), and the detail of the blending operations block 24 (that utilizes the output values from the screeners and the blending coefficients as pointers to obtain an output value). In this case there is described a pre-calculated LUT approach (to obtain very high-speed operation) to generate the output (blended halftone data, please see FIG. 3 for the equations) to the GRET blocks (see FIG. 1 for detail). As may be seen in FIG. 3 after the contrast index is calculated the blending coefficients are generated according to the illustration in FIG. 3. For the example of a contrast index of 0.4 an output value from screener No. 1 (18) is multiplied by 70 percent while the output from screener No. 2 (20) is multiplied by 30 percent. As can be discerned from FIG. 3 contrast indices that are relatively small or relatively large have 100 percent multiplied by one screener value and 0 percent multiplied by another screener value.

Figure 5:
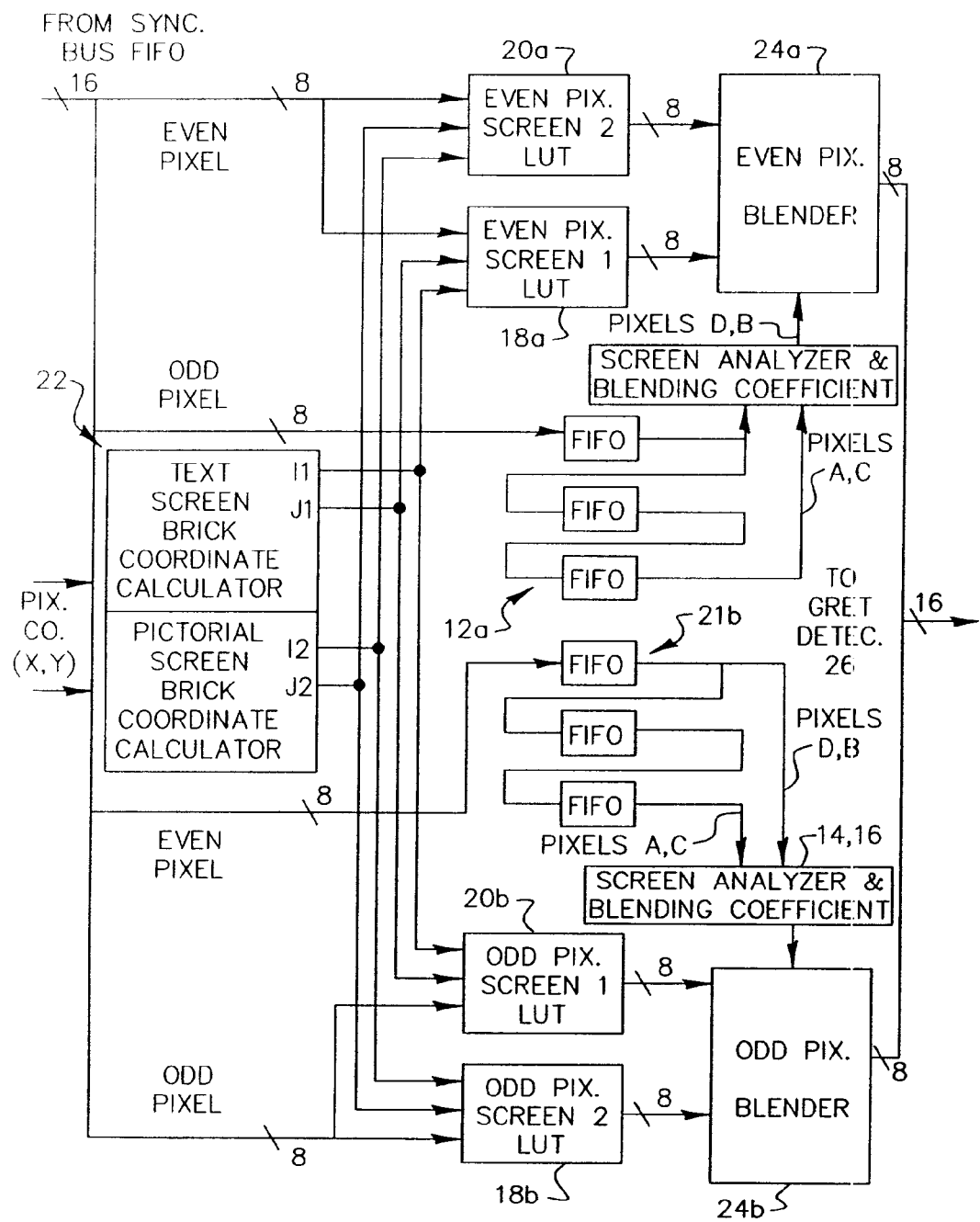
FIG. 5 is another block diagram showing greater detail of a portion of the system of FIG. 1.

In FIG. 5, there is shown a detailed implementation of the functions such as screen address calculator 22, screeners 18, 20 using LUTs (for high-speed operation) and the blending operation blocks 24 (blenders). To achieve higher speed, a dual processing channel approach is used. In this dual channel approach the current even pixel and the current odd pixel are separately simultaneously processed. In order to calculate contrast index of the current even pixel there is only required certain neighboring odd pixels of the current even pixel. For the current even pixel a first in first out buffer (FIFO) 21*a* is provided to store the neighboring odd pixels necessary for the contrast index determination for the current even pixel. Similarly, for the current odd pixel a FIFO 21*b* is provided to store the neighboring even pixels necessary for the contrast index determination for the current odd pixel. The current even pixels are input respectively to the even pixel screen LUTs 18*a*, 20*a*; and the current odd pixels are input respectively to the odd pixel screen LUTs 18*b*, 20*b*. The outputs of the screeners and the blending coefficients calculated from the respective contrast index for each of the odd and even pixels are input to the respective pixel blending operation processor 24*a*, 24*b*. For rational screens, coordinate addresses of rendered screen values (depending on screen angles and screen frequency, different color separations can use different screener angles and frequencies, those addresses can be different) are generated in accordance with the description provided below. The pixel clock and line clock are used to increment counters depending upon the current pixel location with respect to the rational screens to obtain a coordinate output to the halftone screener LUTs (18*a*, 18 *b*, 20*a*, 20 *b*) that store the halftone screen multi-level output based on the input pixel value and coordinate value calculated.

Generation of Rendered Screen Values

Figure 6A:
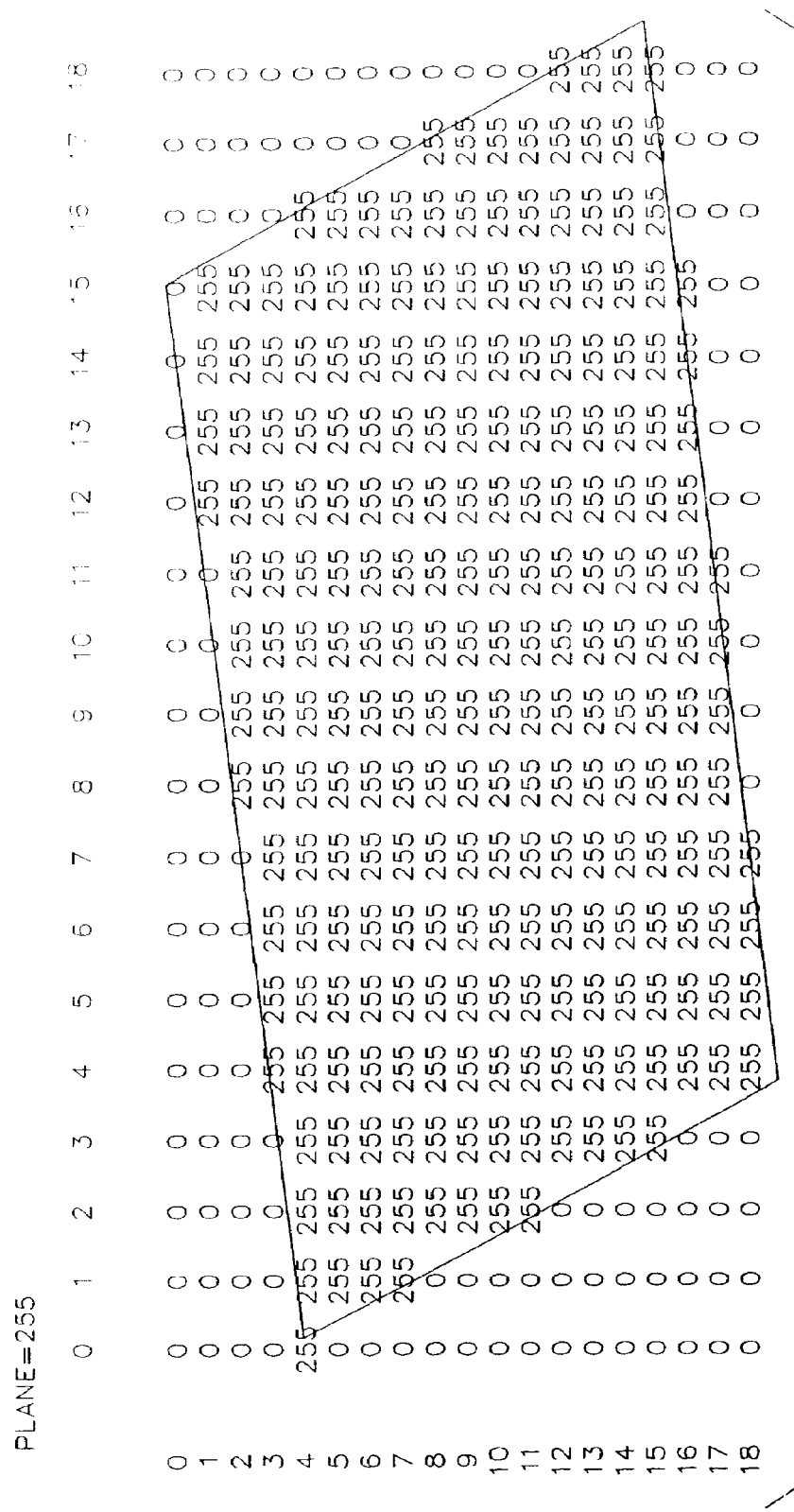
FIGS. 6 (a), (b) and (c) are illustrations of 19×19 pixel halftone screen tiles that may be used as one of the halftone screens in the system of FIG. 1.
Figure 6B:
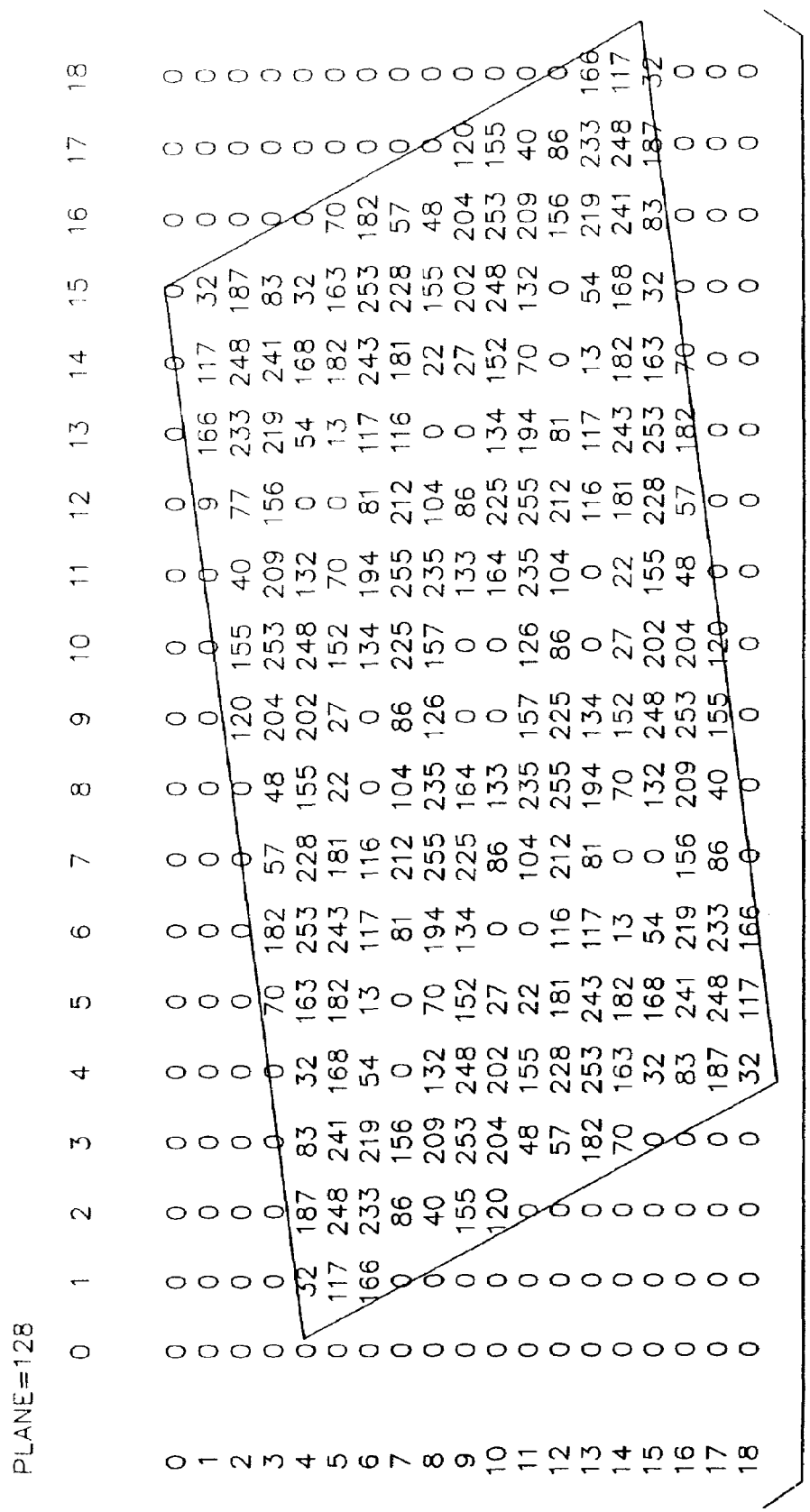
Figure 6C:
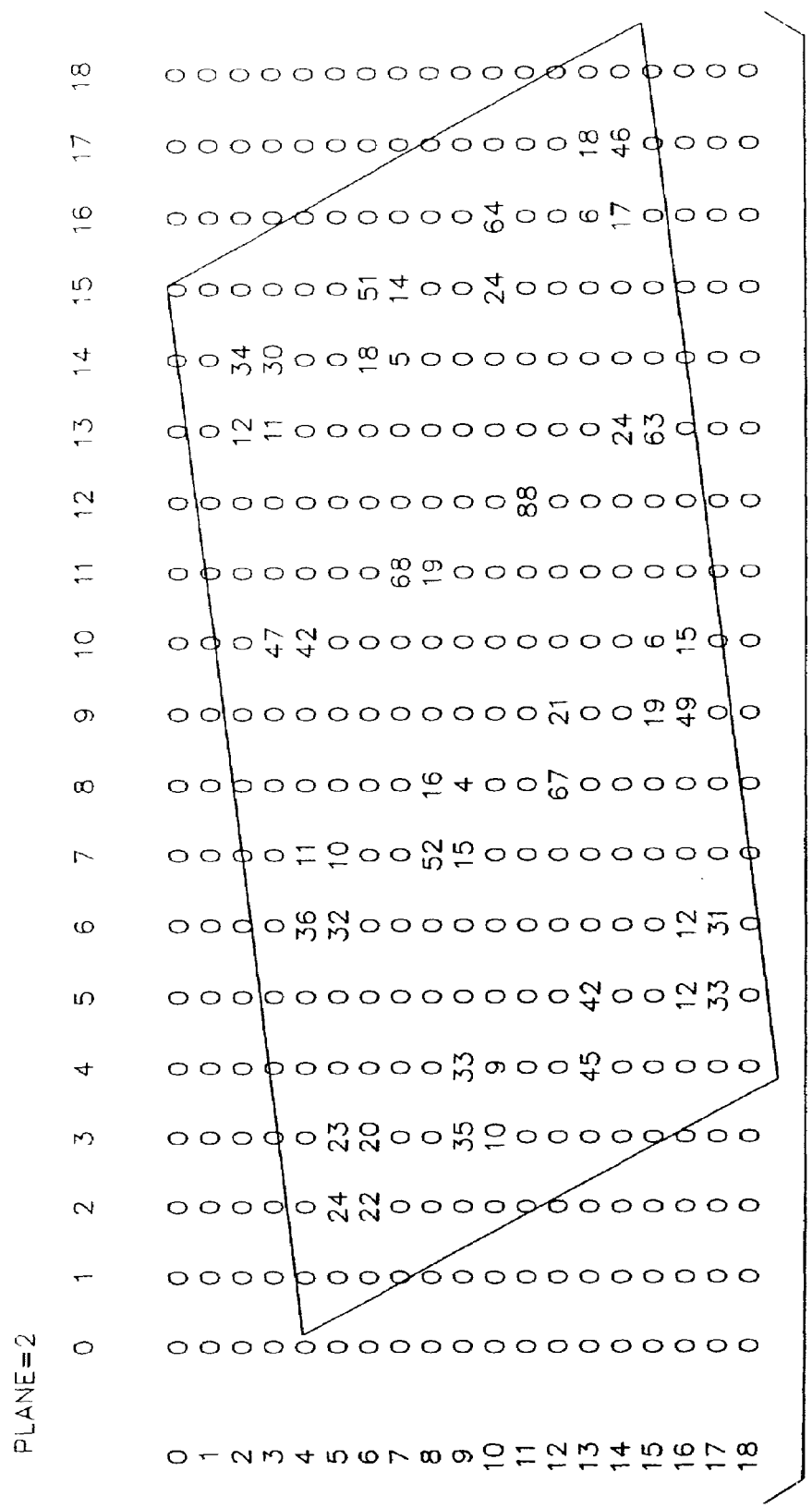

With reference now to FIG. 6 (*a*), (*b*), (*c*) there is illustrated in each drawing a conventional screen tile defined within a 19×19 rectangular array. The screen tile is a 4×15 rotated square. The screen tile is used to render 154.6 LPI (lines per inch) screen rulings at 600 dpi (dots per inch) within 14.93 degrees screener angles. It will be understood that in each drawing the tile represents halftone rendering values for one gray value, 255, 128, 2 in an 8-bits per pixel system.

Reference will now made to the data in FIGS. 7(*a*), (*b*), (*c*) which illustrates for each of gray level planes 255, 128, and 2, a string of 241 numbers that can serve as a repeatable numerical series that represents the respective halftone tile. Although in FIG. 7(*a*) there are shown 241 numbers in various rows and columns, the 241 numbers are best visualized as being in a single row or brick of 241 numbers. For the case of planes 128 and 2 it is more apparent that in the typical gray level case the numbers in the brick are not all the same. As indicated in FIG. 7 (*a*), the brick width is 241, the brick height is 1, and there is an identification of a brick offset of 177, which will be described below. The use of the brick concept will be demonstrated to show that halftone rendering values may be determined for any pixel location in an image using the 241 values associated with each gray level. It will be understood of course that these 241 values are determined based on the screen ruling frequency, screen angle and size of screen tile and represent the halftone rendering values for only one color separation. Typically, it is desirable that each color separation have a screen angle different from that of another color separation color when used to make the same multicolor image particularly with regard to pictorial halftone screens.

Figure 8:
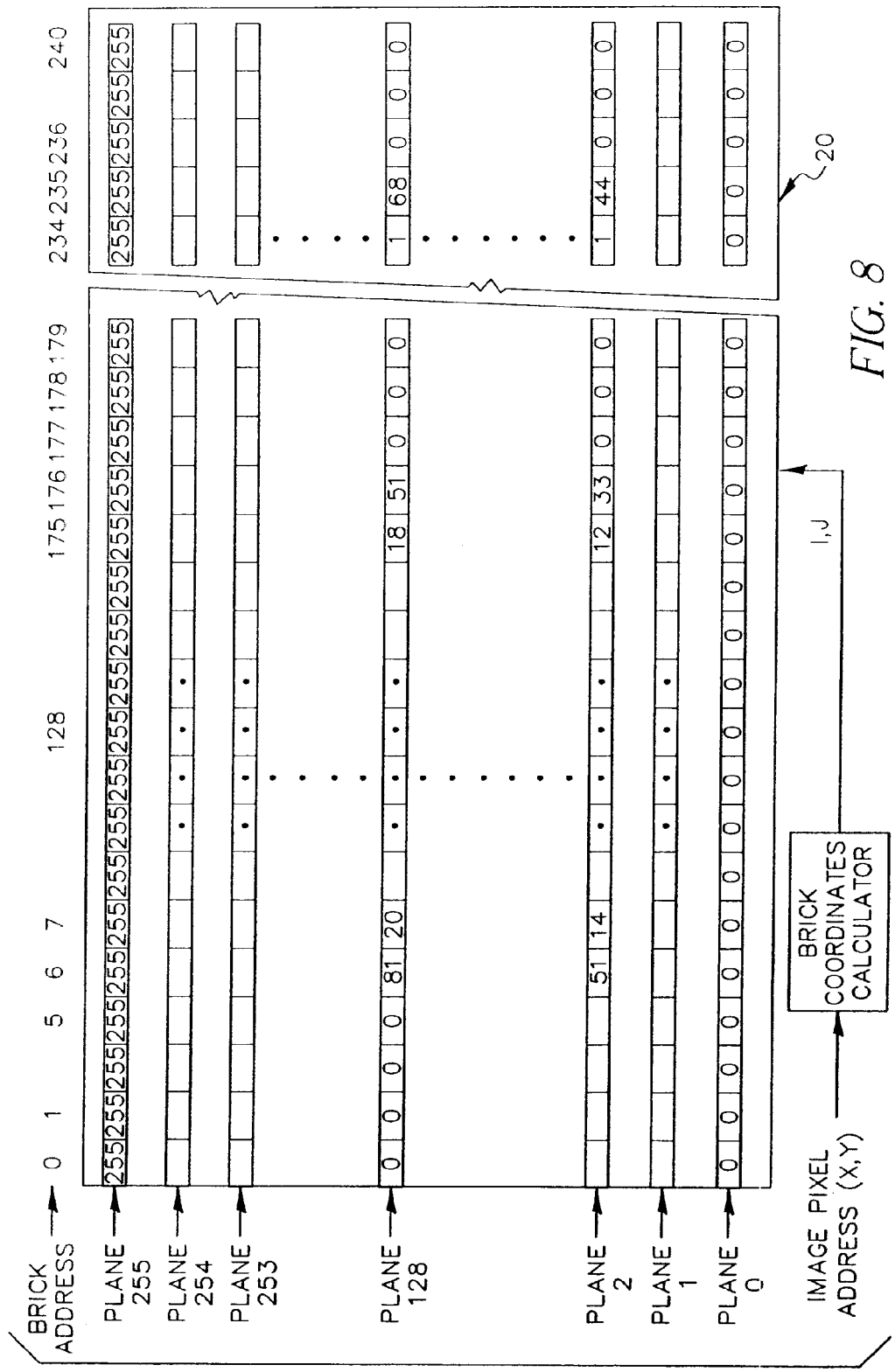

With reference now to FIG. 8 there is shown an illustration which is in furtherance of the explanation of the concept of the use of the brick series of numbers of rendering values. As shown in FIG. 8 a pixel value P(x,y) is input to an optional lookup table which is used in the situation where the incoming pixel is a different order (bit depth) from that of the rendering values. Thus, if the incoming pixel has a gray level bit depth of, for example, 12, it may be converted by the lookup table to a bit depth of 8. The pixel to be halftone rendered and modified so as to be of the appropriate bit depth is indicated as g(x,y). The gray level of this incoming pixel identifies or serves as a pointer to one of 256 brick planes 0-255. Each brick plane incorporates the series of numbers of the brick for that gray level. Thus, plane 255 incorporates the series of 241 numbers shown in FIG. 7 (*a*). In addition to the gray value of pixel g(x,y), there is also provided the x,y coordinate location or image pixel address for the pixel in the image. The coordinate location will be used to locate the specific rendering value for that pixel in the pixel plane defined by the gray level for that pixel.

Reference will now be made to the flowchart of FIG. 9 for calculation of a coordinate value I,J in a brick plane wherein there is known the current pixel's coordinate value in the x,y image plane. In the example provided the coordinate value J is at all times equal to one since in this particular case the brick height is one because of the nature of the halftone screen lines. For other screens the brick height may be two or more.

In order to determine a rendering value for the pixel g(x,y) the gray level plane is determined by the gray value of the pixel and consider now the first line of pixels to be rendered. The coordinates in the image plane of the first pixel in the first line of pixels are X=0, Y=0. The first number in the brick (I=0,J=0) of the gray level plane of that pixel is the rendering value for this pixel. The second pixel in the first line of the image plane (X=1,Y=0) is rendered by the second number in the brick of the brick plane having the gray level for that second pixel and so on for the first line of pixels g(x,0) until the 242 nd pixel is to the rendered. For this pixel we return to the beginning of the brick string or series of numbers and repeat from brick coordinate I=0 to 240 in repeat fashion and so on until all pixels for line Y=0 are halftone rendered.

For the next pixel line Y=1 the first pixel in this line g(0,1) will map to offset location I=177 in the brick, which location is particular for this screen, and different lines of the image will be found to have the starting position in the brick begin at different calculated offset locations. The next pixel in the image line g(1,1) will map to rendering location I=178 and so on until location 240 is reached. Mapping of the next pixel in this image line then begins at rendering location I=1. Thus, an offset is only used to start a new image line at various calculated offset locations. Thus, for pixels in the second image line, Y=1, the pattern is a mapping sequence of I=177 to 240 (for image pixels X=0 to 63), I=0 to 240 (for image pixels X=64 to 304), I=0 to 240 (for image pixels 305 to 545), etc. until all pixels in this line are halftone rendered. For the next following line Y=2 the repetition pattern is I=113 to 240, 0 to 240, 0 to 240, etc., until all pixels in this line are halftone rendered. It should be noted that for each pixel to be rendered a variable will be its gray level value so that a different brick plane is considered on a pixel by pixel basis depending upon the gray value of the pixel.

Figures 9, 10:
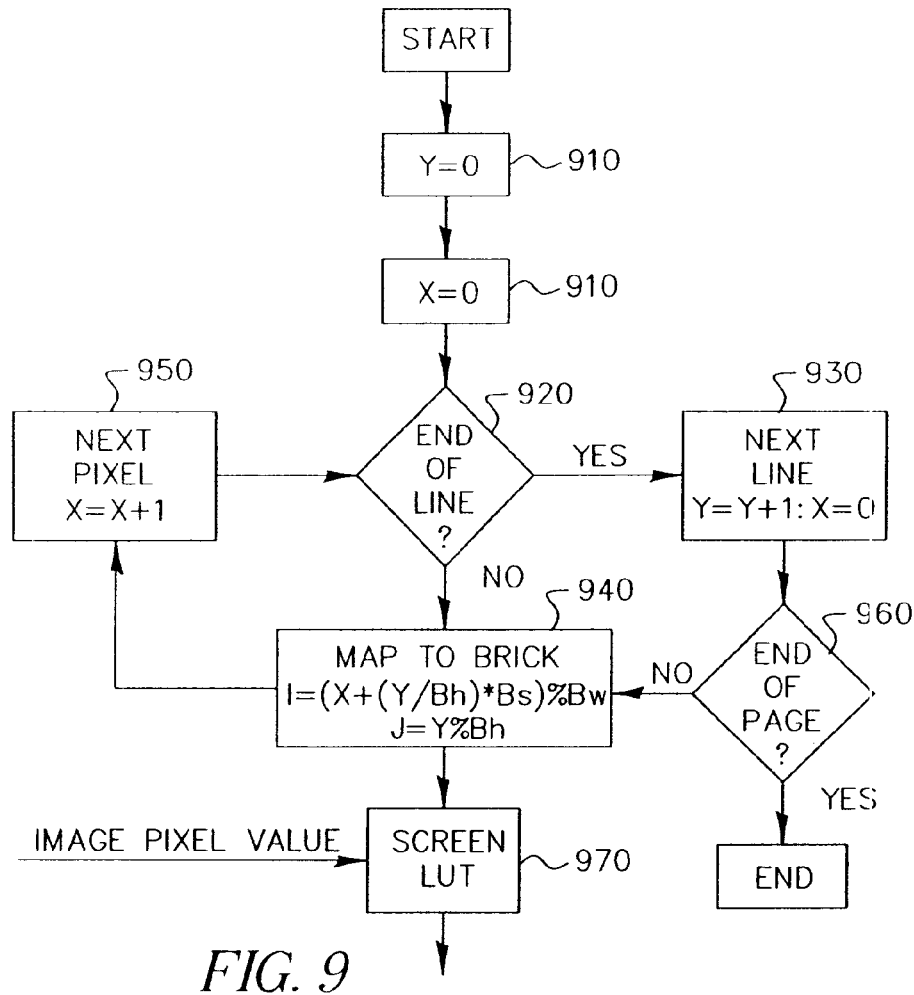
FIG. 9 is a flow chart that may be used to determine a brick coordinated address in a lookup table structure of FIG. 8.
FIG. 10 is an example of a text screen tile for use in determining a halftone rendered text screen value.

A robust implementation of this processing is indicated by the flowchart of FIG. 9 where each pixel 950 in a page 960 (beginning at location x=0, y=0 910) is mapped line-by-line 920, 930 to a certain location (I,J) 940 in a brick plane which location is then provided as one input to a halftone screen lookup table 970 that also has input to it the gray value g(x,y) of the pixel. The lookup table 970 stores rendered pixel values for halftone rendering of the image pixel g(x,y). In this example there are 241×255 rendering values in the LUT (brick width times number of brick planes). Further reduction of the size of the table can be made by recognizing that gray value 0 and 255 have I and J values that are irrelevant since in this example each pixel having a gray value of 0 and 255 is rendered at that respective value. In the flowchart of FIG. 9 the pixel image coordinate value x,y is input to a calculator that takes the value of the x-coordinate and adds that to a value of the y coordinate which has been first divided by the brick height and then multiplied by a brick offset value. This sum is then divided by the brick width wherein only the remainder is retained as the brick coordinate value for I. For example, where X=178,Y=1, Bh=1,Bs=177, and Bw=241, the calculation is made of adding 178+(1/1)177=355, which is then divided by the brick width of 241 to yield a remainder I=114. The J coordinate value is determined by taking the y coordinate value in the image plane and dividing it by the brick height and retaining the remainder as the value for J. In this example for this screen the value of J is always zero, however, as noted above, some screens may have a brick height of two or more and so the J coordinate in the brick plane becomes essential to determine. Implementation of the brick coordinate calculator may be by software as processed by a computer or by a chip that is designed to perform this calculation. The calculation may be expressed by the formula:

$$I=(X+(Y/Bh)*Bs)\%Bw$$

wherein "%" indicates that a division operation is made wherein a remainder is determined. As noted above, Bh in certain situations is equal to one so the equation simplifies in such situation to:

$$I=(X+Y*Bs)\%Bw$$

Figure 11:
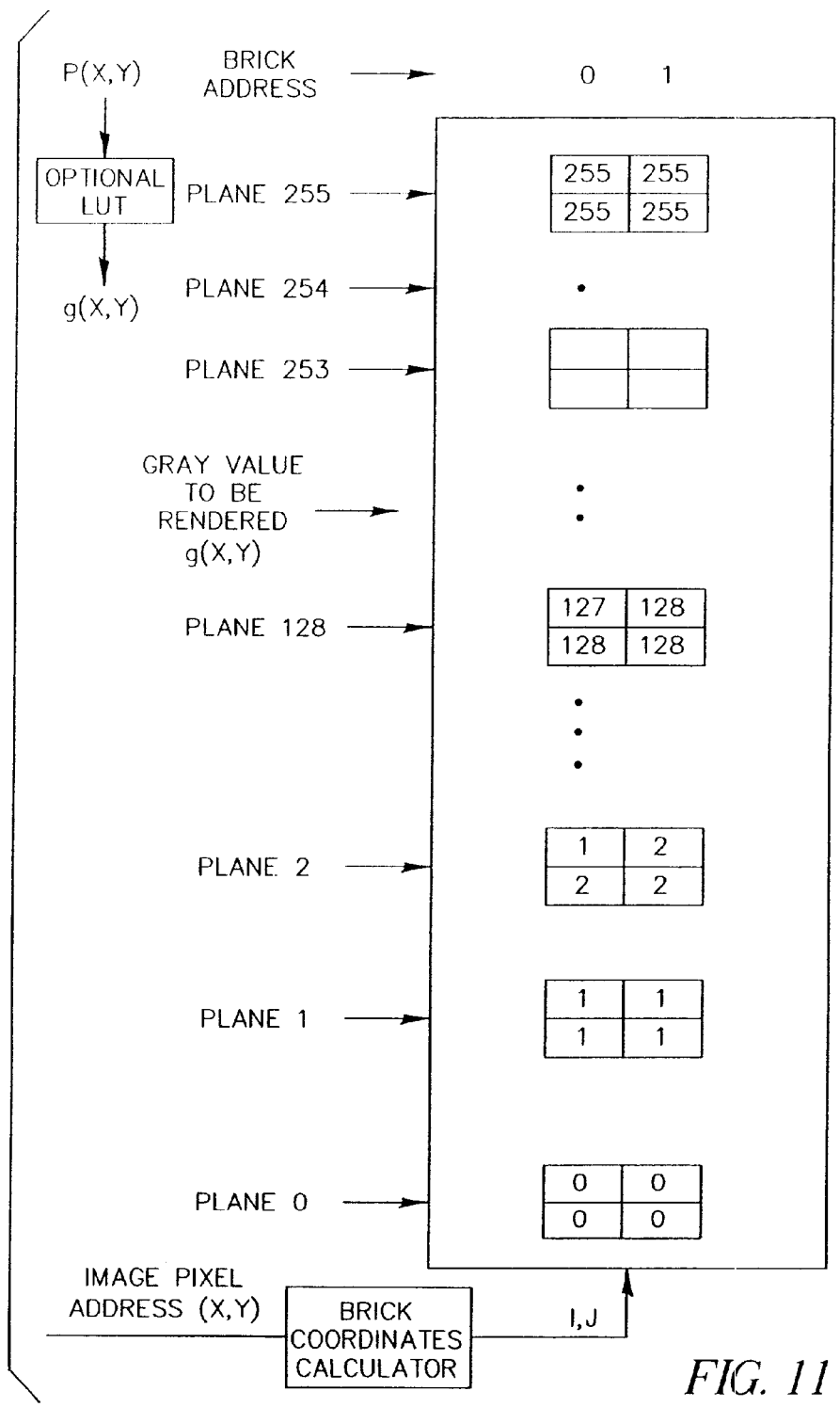
FIG. 11 is an example of the screen address brick that is used to generate the halftone screen pixel rendered values for the text screen of FIG. 10.

As noted in FIG. 5 separate simultaneous processing may be made of the odd and even pixels and a hardware or software implementation may be provided to accommodate calculation of brick coordinate value simultaneously for the odd and even pixels. In addition, since there will be rendering with both a halftone pictorial screen and a halftone text screen, there may be simultaneous implementation of calculations of brick plane coordinates for the text screen as well as the pictorial screen. An example of a text screen is illustrated in FIG. 10 and a look up table featuring rendering values utilizing the planes of bricks technique for rendering pixels processed by the text screen is illustrated in FIG. 11. As may be seen, the text screen is significantly simpler than the pictorial screen and does not require rotation between color separations as is the case for pictorial screens. However, the particular text screen featured does have two rows of bricks for each brick plane.

Figures 4, 5, 21:
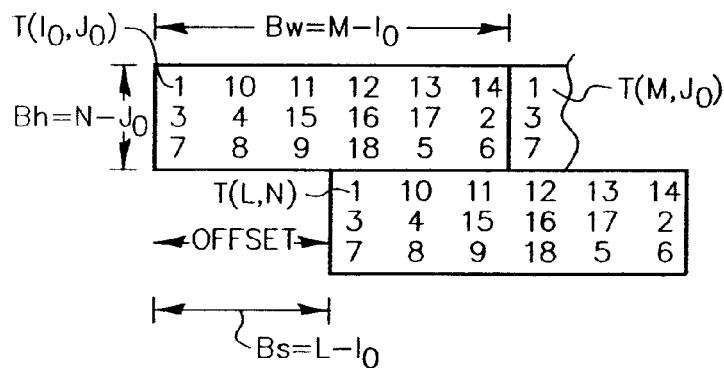
Figure 22:
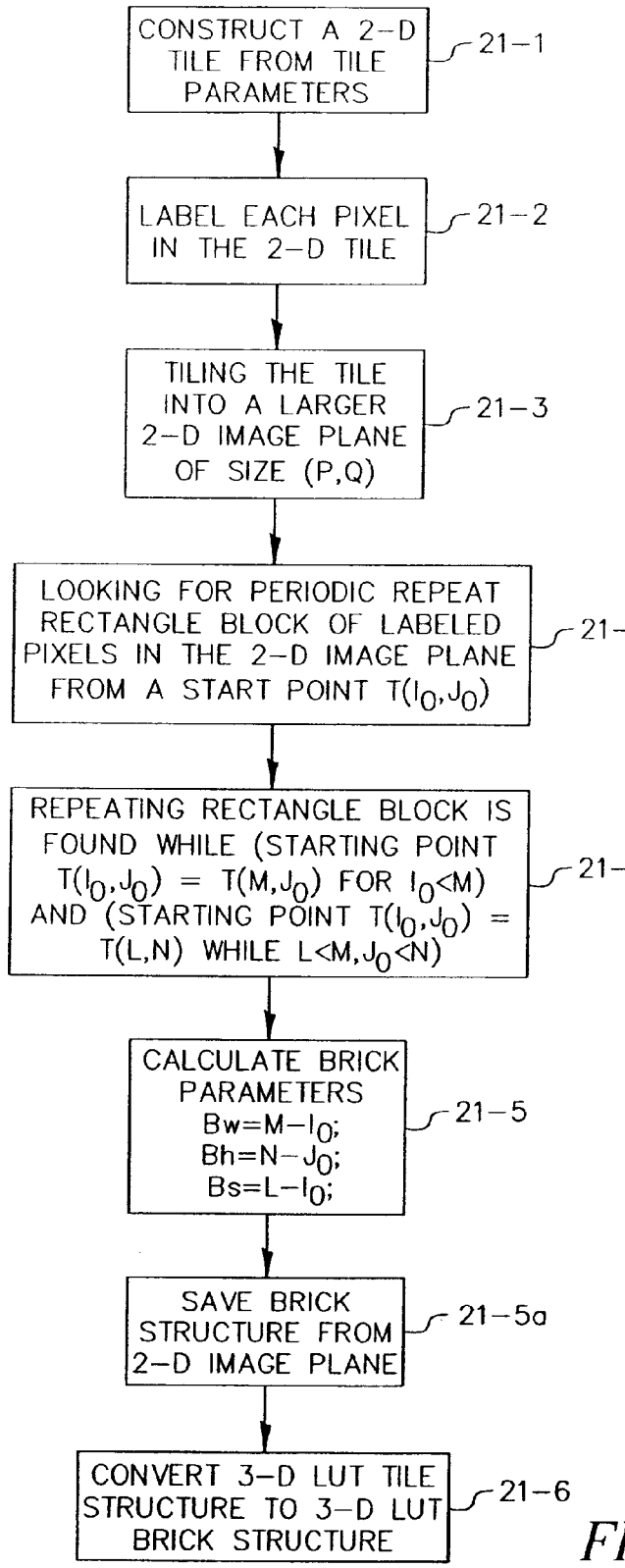
FIG. 22 is a flow chart of a process for forming a brick structure.

The preferred technique for generating a look up table of rendered halftone screen values is illustrated in FIG. 22. The steps in the flow chart of FIG. 22 are shown in greater detail in FIGS. 21-1 through 21-6. Therefore, FIG. 22 should be viewed in conjunction with FIGS. 21-1 through 21-6 in order to see the preferred embodiment. FIG. 22 illustrates the steps taken by the present invention to create a "BRICK" which is essentially a rectangular buffer that holds halftoned values in a three dimensional space. The three dimensions are arranged such that there is a plurality of half tone planes, each of the planes correlates to a different intensity value for a pixel. Within each of the planes, halftoned microdots are located by coordinates that correlate to the X-Y coordinates of the image that is being halftoned. The "BRICK" is created to stored repetitive series values that result from tile parameter used to construct the tile.

The first step in constructing "BRICK" is to construct a 2-D tile from the tile parameters 21-1. As shown in FIGS. 21-1, a tile structure for a screen example having 141 lines per inch at 600 dots per inch, with a 45 degree screen angle has the pixels within one of the tiles identified as C1. While, these pixels labeled C1 represent those pixels which belong to the same tile, it should be noted that the entire image plane will be comprised of similar tiles that intermesh. It should also be noted that the pixels forming the tile form one cell or super cell and that tiles may be formed having plural cells or super cells within a tile structure. In the case were the tile has plural cells or super cells there may be duplicative sets of pixel sequence numbers within a tile.

The individual pixels of the tile of this example have a unique location relative to other pixels within the tile which can be identified, therefore the flow chart of FIG. 22 will perform the step to label each pixel in the 2-D tile 21-1, which is shown graphically in FIGS. 21-2 wherein the pixels are labeled with sequence numbers 1 through 18. Generally the shape of the tile structure and number of pixels therein and orientation of the tile is a function of the screen frequency and screen angle. The flow chart of FIG. 22 then performs tiling the tile in a larger 2-D image plane of (P, Q)

of entire image 21-3 which is seen in FIGS. 21-3 wherein the image plane is filled up with the sequence numbers of the respective tiles.

The flow chart of FIG. 22 will then proceed to look for a periodic repeats within the pixel in the 2-D image plane 21-4 wherein the repeats form the block are as defined by 21-4a, as shown in FIGS. 21-4. FIGS. 21-5 illustrates calculate BRICK parameter 21-5 and saving the brick structure from a 2-D image plane 21-5a wherein the repeating rectangular blocks of sequence numbers in the image plane are place into a BRICK, or buffer. At this point a minimum repeating block or brick is found that has a brick width (Bw) of six sequence numbers and a brick height (Bh) of 3 sequence numbers. The tile structure dictates that the fourth line in the BRICK start from an offset position of 3 sequence numbers, this is referred to as brick offset Bs. The brick offset is determined from the tile structure which is in turn determined from the (screen angle and screen ruling) used to create the tile. The brick offset is placed into the buffer to enable the system to read out the tile data in the brick in accordance with the tile parameters.

After determining the parameters of the brick width, brick height and brick offset, the values for the look up table of rendered values may be substituted for the sequence numbers of the pixels. For this particular screen the sequence numbers for the pixels are consistent for all tile gray level values 1-255 for an eight bits per pixel system. However, for each tile gray level value a particular sequence number in the tile will correspond to a particular rendered value. This is illustrated in FIGS. 21-6 which shows that for gray level 2 value for the tile that the pixel having sequence number 1 has a rendered gray level value of 106 while all other pixels in the brick have a rendered gray value of 0. In the example of the tile having a gray level of 128 it can be seen that only a few pixels in a tile have rendered values of 0 whereas other pixels have rendered pixel values other than 0. At tile gray level 255, in this example, all pixels in the tile have a rendered value of 255.

With reference now to FIGS. 23 (a)-(c) a tile structure is illustrated that represents a screen structure for a tile having four cells or super cells within the tile structure. This tile structure corresponds to a screen having 171 lines per inch at 0 degrees angle of rotation. As can be seen in FIG. 23 (a) the four cells have three different shapes. A corresponding brick structure for this tile is also illustrated in FIG. 23 (a). As can be seen this brick structure has the brick height of 7 with no brick offset. In FIGS. 23 (b) and (c) the brick structure and the tile structure are illustrated with respective rendered pixel values for tile gray levels 2 and 128 for a halftone dot having a distributed dot type growth pattern. In this type of halftone dot growth pattern of gray level dots in a cell, growth tends to be distributed to several pixel members of the cell as cell gray levels increase. This growth pattern is different from the full dot type growth pattern wherein growth of cell gray level tends to increase through increasing the gray level of one pixel until the pixel becomes a maximum gray level at which point gray level growth of the cell tends to increase at a next pixel location in the cell. It will also be noted that the brick structure corresponds to the tile structure in this example.

Figure 24:
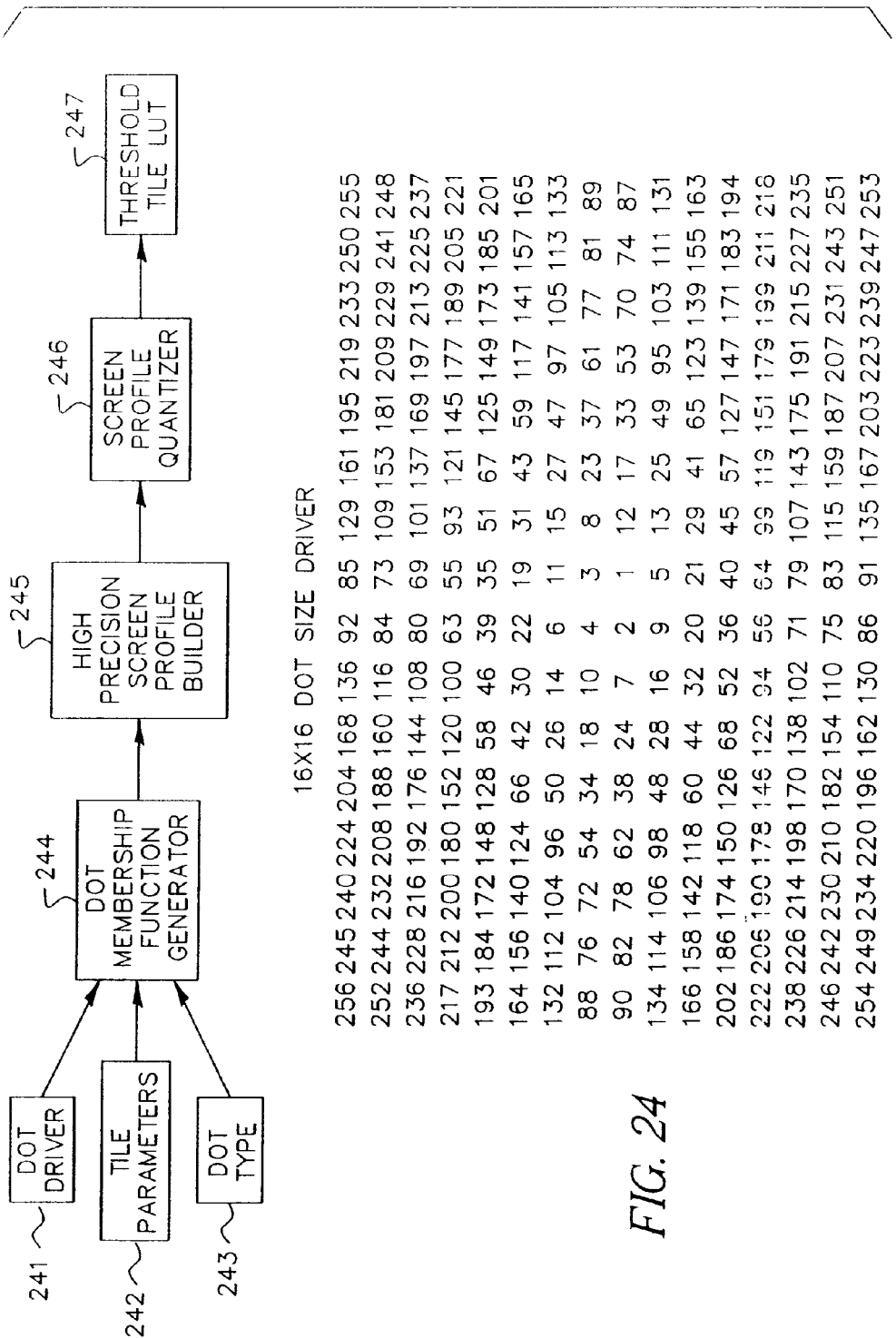
FIG. 24 is an illustration of a dot size driver having a circular or spiral type of growth pattern and used in generating rendered screen values for a tile.

In order to generate rendered screen values for a tile the various tile parameters 242 such as screen angle, lines per inch, number of gray levels per pixel are considered. In addition the nature of the dot driver 241 and dot type growth 243 pattern are also considered. An example of a dot driver is illustrated in FIG. 24 for a 16×16 dot size driver having a circular or spiral type of growth pattern wherein dots in a cell tend to grow from the center outwardly. Other types of dot drivers may be used and suited to other shapes of growth patterns such as growth along a line, or an ellipse. These factors may be input to a dot membership function generator 244, which considers cells within a tile and the contribution of neighborhood pixels within that tile. A screen profile builder 245 may then be used to determine the total gray level in the tile by summing of the exposure values at pixel locations that are not yet quantized. A screen profile quantizer 246 then quantizes the individual pixel rendered values so that these values can be expressed in a form of a whole number, for example, 0-255 in a system having an eight bits per pixel bit depth, and used by the threshold tile LUT 247.

It will be understood of course as described herein an assignment of a rendered screen value does not imply that this is a value that is output directly to a printer as other image processing operations may be implemented upon the rendered screen values obtained. Thus as described herein a rendered screen value for a particular pixel may be subjected to thresholding to establish eligibility for further processing such as edge enhancement processing or to a blending operation.

Figure 12:
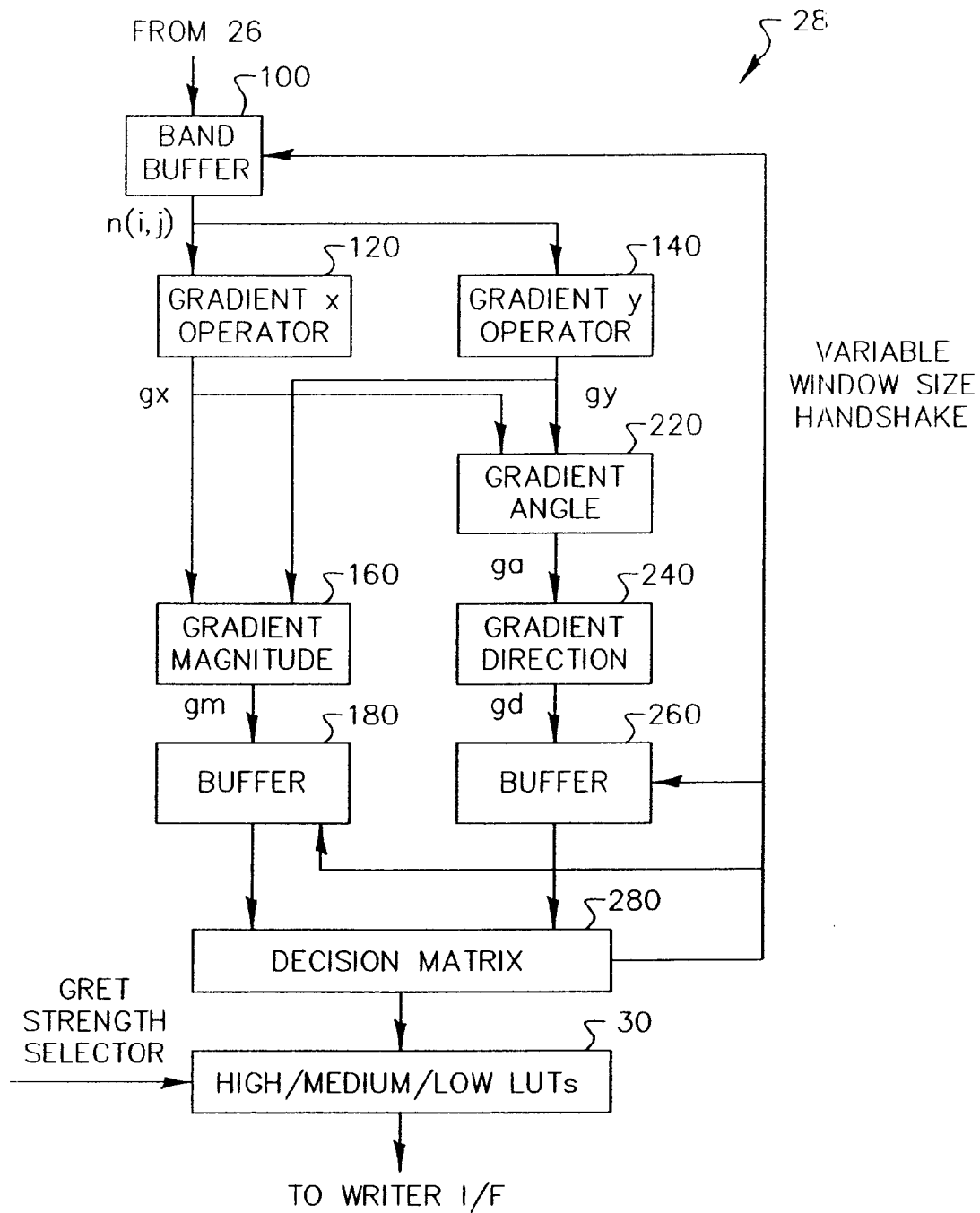
FIG. 12 is a block diagram of a preferred gray level edge enhanced processor used in the system of FIG. 1.
Figure 13:
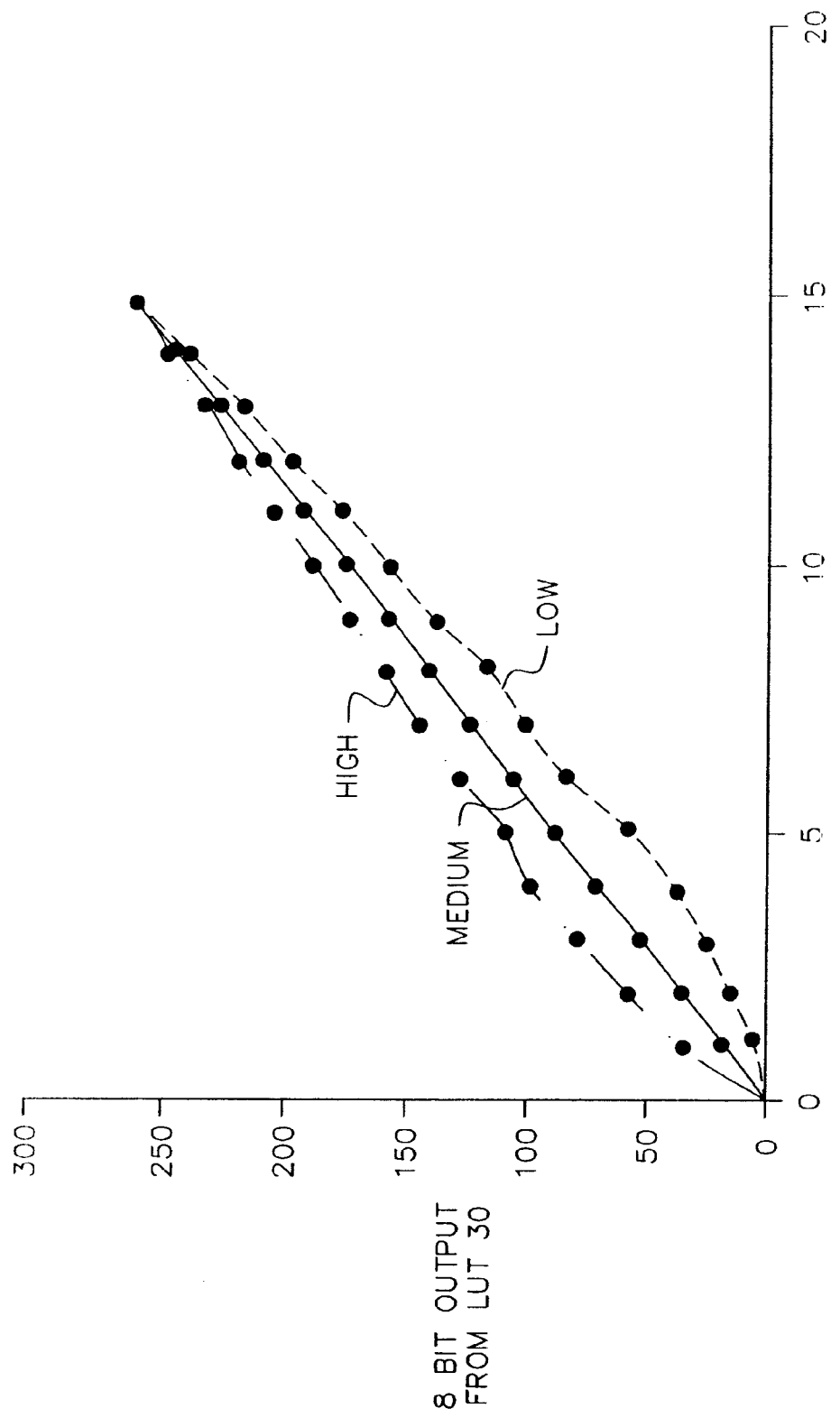
FIG. 13 is a chart illustrating a relationship relative to different types of output from the gray level edge enhancement processor.

A functional block diagram of a one example of an edge enhancement processing system that may be used in the method and apparatus of the invention is illustrated in FIG. 12. As noted above, the input into the GRET processor 28 is in the form of a binary bitmap through adjustment by GRET adjustable threshold/detector 26. This is with regard to data that has been subject to thresholding. The data output by the blending operation processor 24 is also bypassed to the GRET or bypass selection device 32. The input into the GRET processor 28 is a binary bitmap where the term "binary" bitmap or image is understood by those skilled in the art to refer to a bitmap or image in which image pixels are either fully or substantially fully exposed or are unexposed or substantially unexposed, i.e., substantially no grayscale pixel data is present. As the GRET processor, in this example, may process pixels at a bit depth of four bits per pixel, the detector 26 may modify the eight bits per pixel image data into the four bits per pixel bit depth required by the GRET processor. The term "gray-scale" refers to image data wherein each pixel is represented by more than one bit of data to indicate one or more shades of gray between fully exposed and fully unexposed. Of course, the actual color of the pixel will be dependent upon the color toner or pigment used in a printing process to develop the pixel. As an example where image data is represented by four binary bits of information, a binary bitmap will have image data represented by either 0 or 15. The binary bitmap includes rows and columns of this image data wherein 0 may represent an unexposed pixel and 15 may represent the pixel area being fully exposed. Of course, these can be reversed. Development is preferably at the exposed pixel area and no development at the unexposed pixel area (known as discharged area development or reversal development but alternatively charged area development may be used). While reference herein is made to "exposed" and "unexposed" pixels, it will be understood that in other printing or display systems equivalent representation of pixels will be provided according to the nature of the system, even though the nature of the system does not employ an exposure, for example, inkjet which employs a deposit of ink.

In the GRET processor 28 the current pixel position as output from a band buffer 100 is indicated by the term n(i,j). Sobel gradient masks 120, 140 for both the horizontal and vertical directions operate on the binary bitmap data n(i,j) to produce a gradient x operator (gx) and a gradient y operator (gy). Typical sobel gradient masks that can be employed include those described in U.S. Pat. No. 6,021,256, the contents of which are incorporated herein by reference. Other gradient masks may also be used. The gradient amplitude or magnitude (gm) is then calculated by a processor 160 by taking the square root of the sum of the square of the gradient x operator (gx) and the square of the gradient y operator (gy) for each location in the bitmap to produce a gradient magnitude map. The gradient magnitude map is then stored in a buffer 180 for later use. Similarly, the gradient angle (ga) 220 is determined for each pixel location to produce a gradient angle map 220. For purposes of convenience, the gradient angle (ga) is preferably limited to a choice of gradient directions (gd) by a gradient directions sorter 240. The gradient direction for each location is stored in a buffer 260. The original bitmap data and the gradient magnitude (gm) and gradient direction (gd) corresponding thereto are supplied to a decision matrix 280, which uses this information to select edge enhanced gray-scale output data to replace the binary bitmap data entering the GRET processor. The decision matrix 280 determines whether the central pixel of a window of the binary bitmap data is a black or white pixel, whether the central pixel is contained in a single pixel line and the position of the pixel with respect to a kink site, by comparing the pixel data to a set of criteria represented by predetermined pixel values and gradient magnitudes. In accordance with rules establishing a set of criteria, the decision matrix 280 generates an address that is supplied to a look-up table LUT 30. The LUT 30 generates edge enhanced gray-scale output data based on the address generated by the decision matrix 280. The enhanced gray scale output data replaces the binary input data output by the threshold/detector 26 and produces a smoother image without jagged edges when applied to a gray scale printhead (for example, a laser, LED, thermal, inkjet or other type of printhead) of a printer or to a gray level display such as a CRT or other suitable display. It will be understood that the GRET system can be implemented as a computer program executed on a general-purpose computer or a dedicated programmed computer or in hardware as a pipeline processing system, particularly in the form of an application-specific integrated circuit (ASIC), or a combination thereof. The LUT 30 as noted in FIG. 1 may be a series of high/medium/low LUTs 30 each of which may be selected by input of a GRET strength selector signal to provide preferences for the type of or strength of edge enhancement.

Variable Strength GRET

Figure 14:
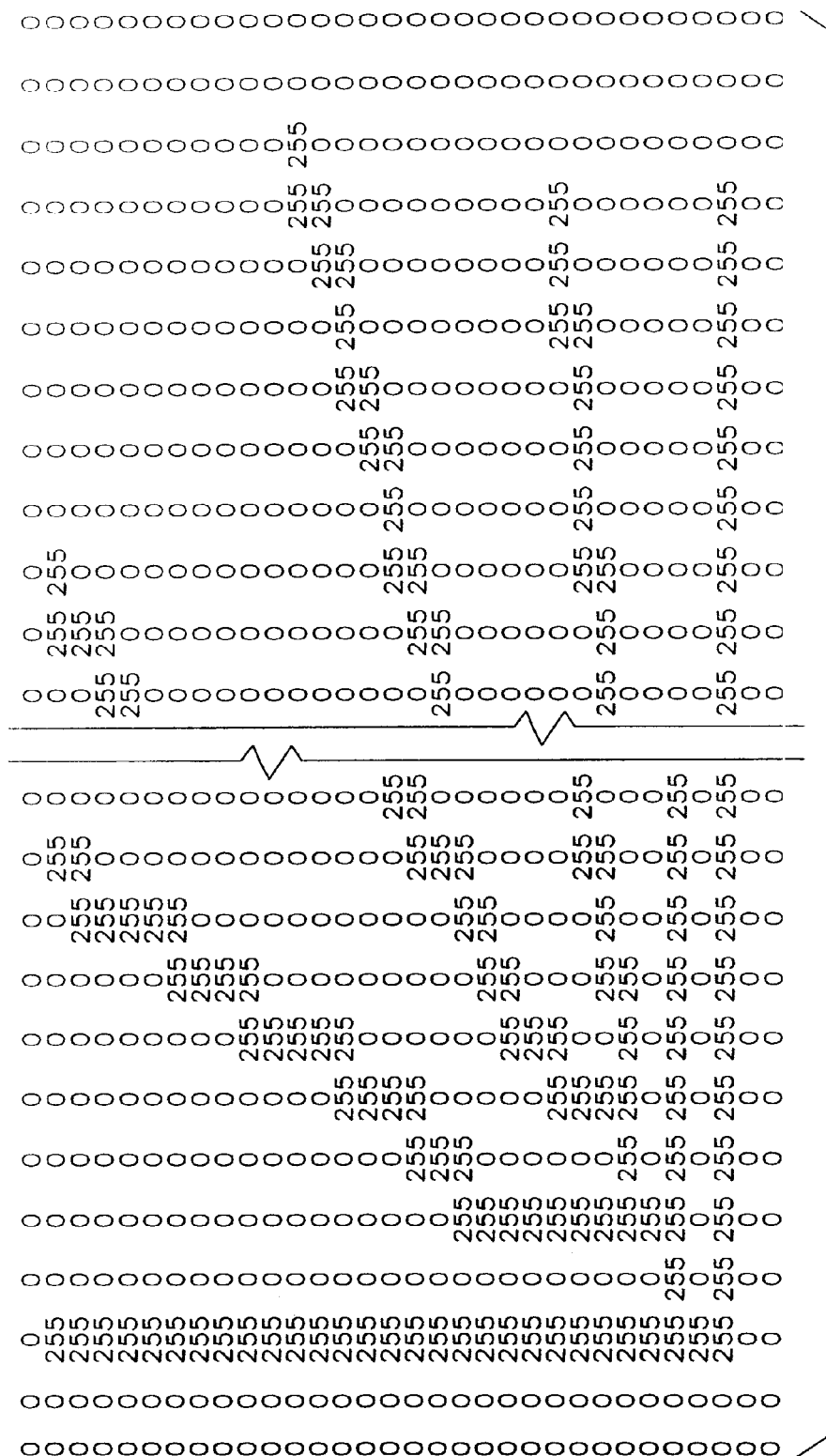
FIG. 14 illustrates schematically a binary image wherein 255 represents maximum density and zero represents background or no density.
Figure 15:
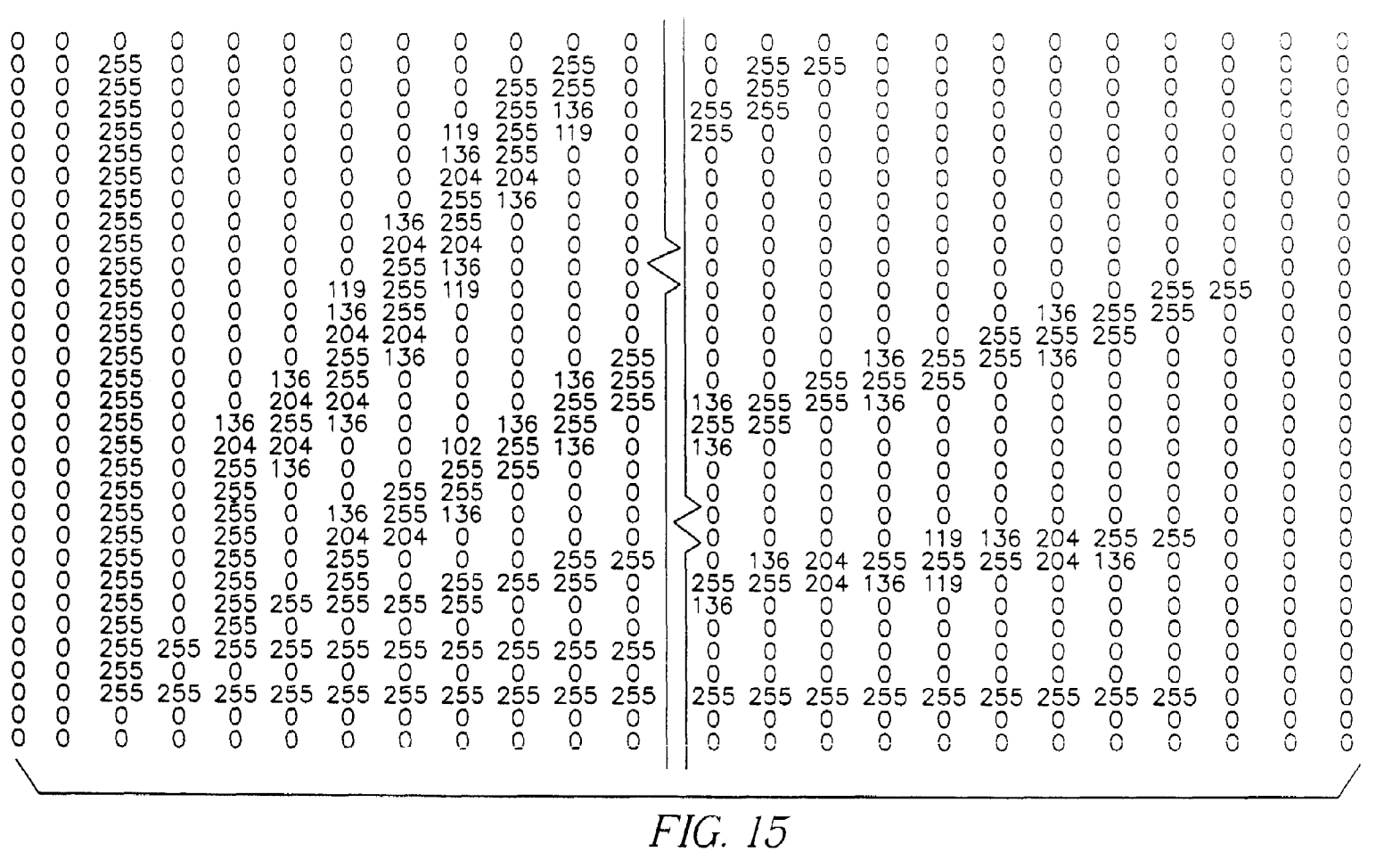
Figure 16:
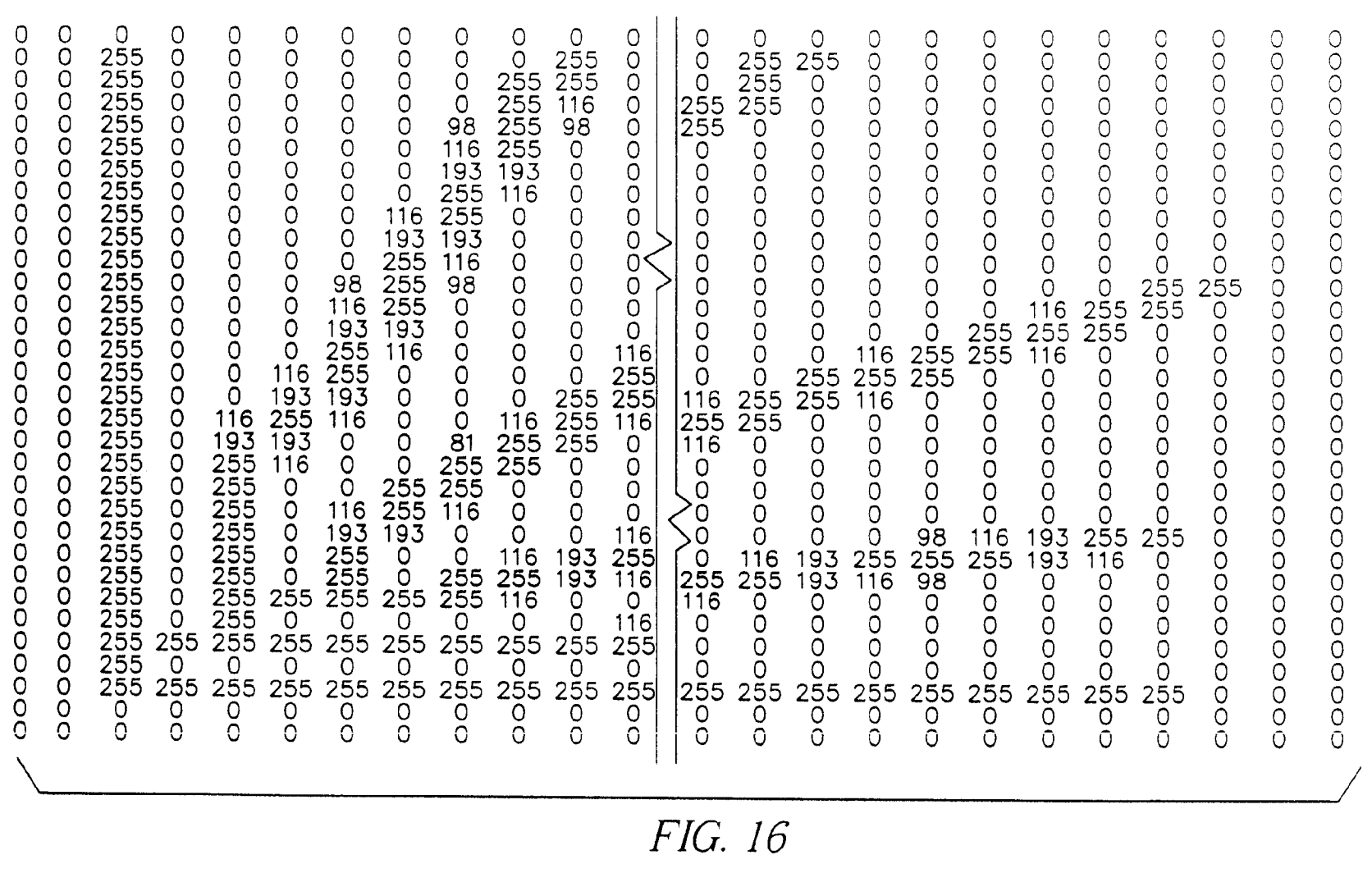
Figure 17:
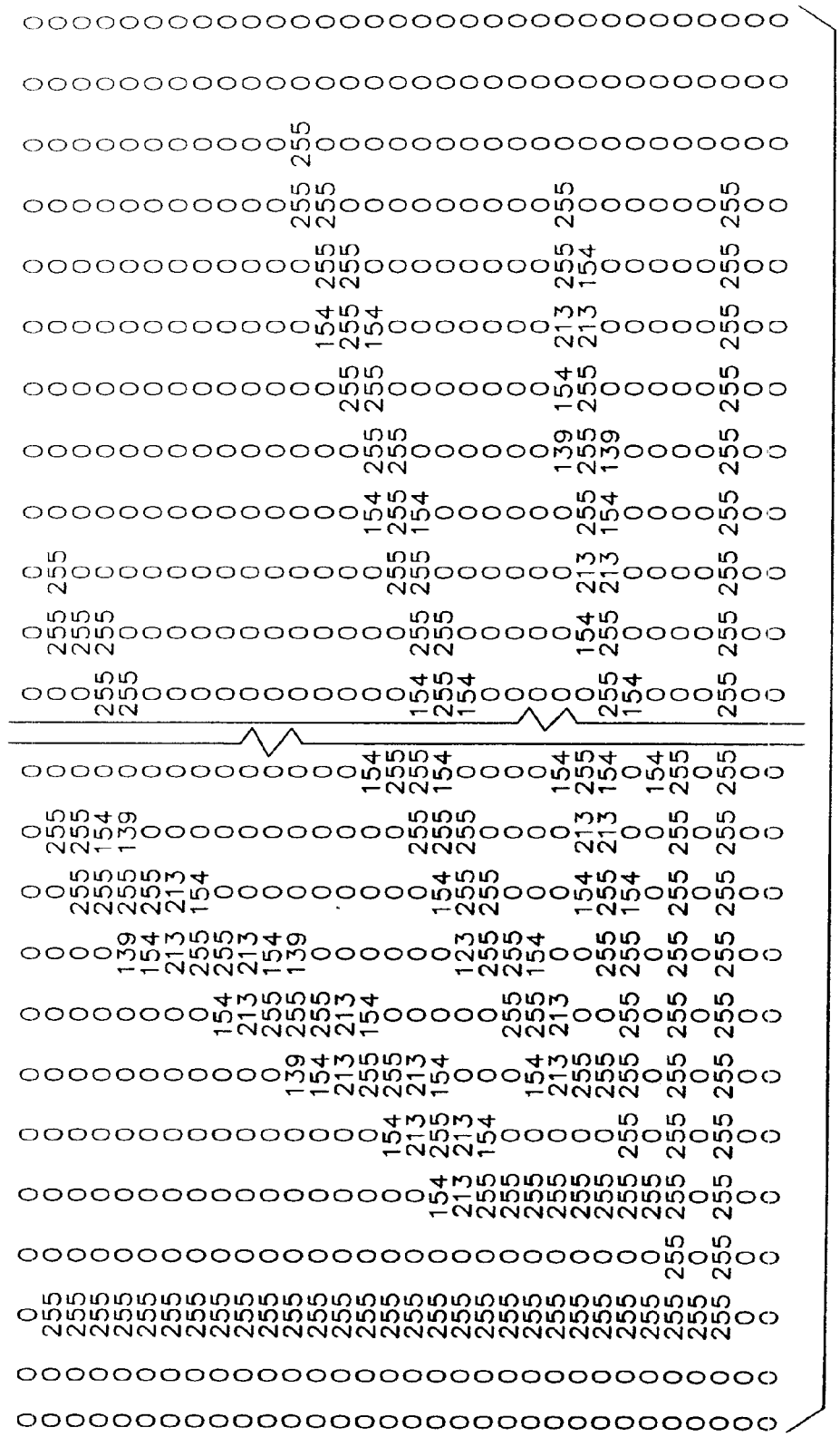
FIG. 17 illustrates schematically a binary image that is provided with gray level edge enhancement in accordance with output from a high-strength setting for a lookup table.

With reference now to FIGS. 13 and 14-17 there will now be provided a description of the operation of the variable strengthening of the GRET output. In FIG. 14 there is illustrated an original image that is binary and represented by eight bits per pixel so that the value 255 represents pixel areas where there will be maximum development while pixel areas indicated as 0 represents no development or background. The image represents various lines emanating from an origin location that run at different angles relative to the origin. It will be noted that there is a staircasing effect or jaggedness in certain of these radiating lines, and it is an object of this resolution enhancement device to attempt to minimize this jaggedness by placement of gray level pixels at particular sites at the periphery of the lines to provide an appearance of relative smoothness. Consider now FIG. 15 wherein there is shown a GRET output wherein the lookup table 30 is adjusted for medium strength. In now comparing FIGS. 16 and 17 with that of FIG. 15, it will be noted that for cases of GRET output using a high-strength lookup table the gray level values added by the GRET processor are different for the cases of high-strength, medium strength and low strength. It will also be noted that values that are binary in nature; i.e., 0 or 255, are not affected. Thus, this provides an additional adjustment to the operator at the workstation WS in allowing for personal preference input adjustments by the operator towards improvements in anti-aliasing. The operator merely selects which option of LUT 30 (high, medium, low strength) he/she prefers to improve on reduction in jaggedness.

Adjustable Threshold Input for GRET Processing

Figure 20A:
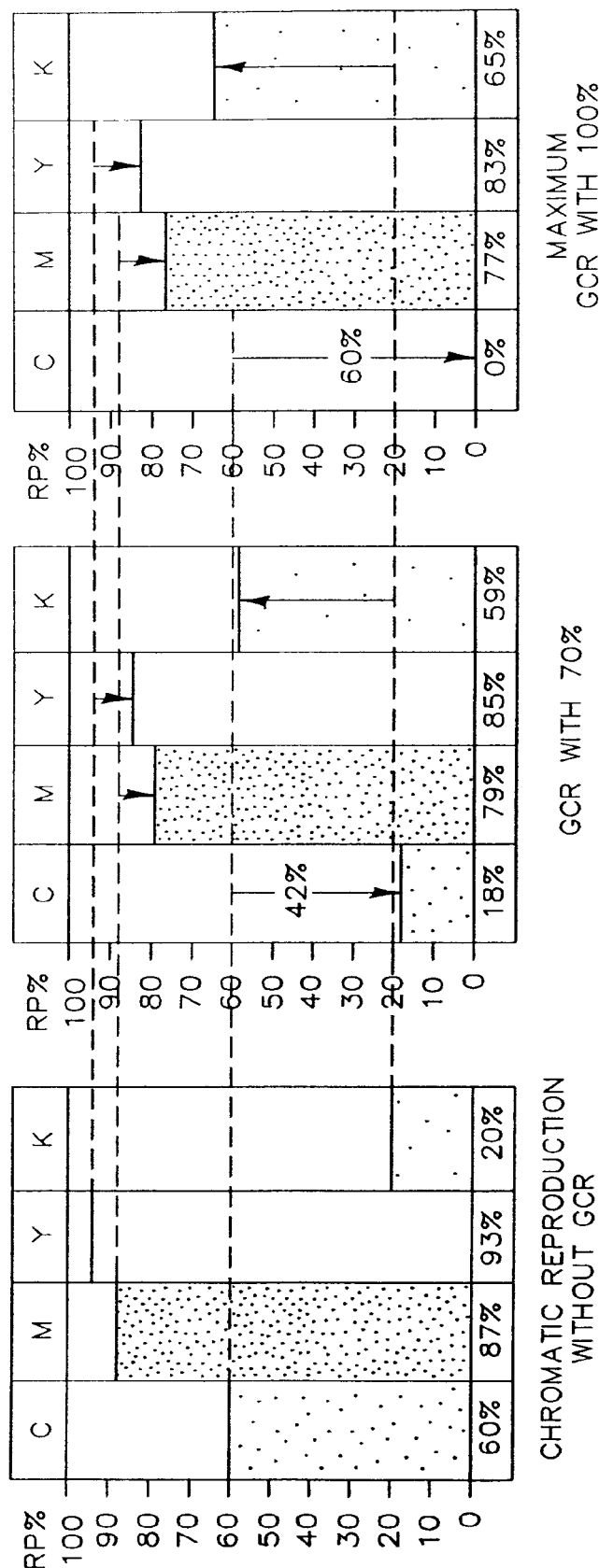
FIGS. 20 (*a*) and (*b*) illustrate an example respectively of gray component replacement (GCR) and undercolor removal (UCR) in a color transformation process.
Figure 20B:
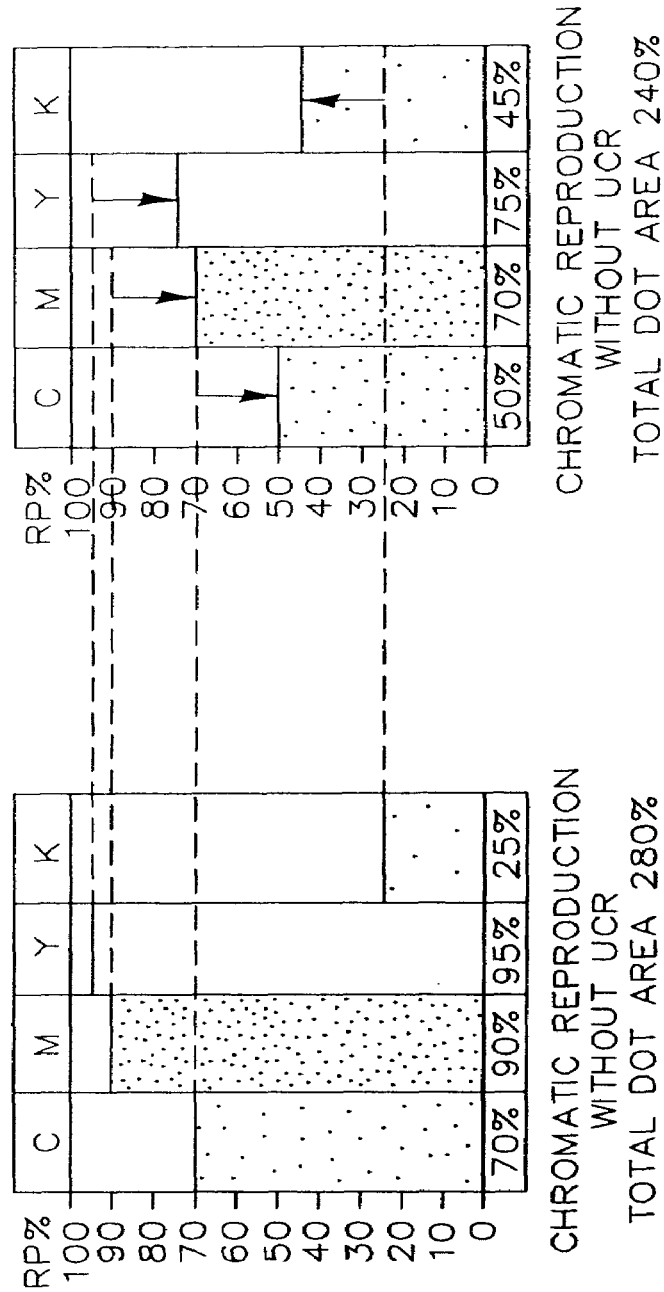

In FIG. 19 there is shown a printer or display apparatus 400 which includes the image processing system 10 described above. The apparatus includes a document that is scanned by a scanner 410 which generates an 8-bit signal representing density scanned. The raw scanned image data typically in the form of red, green, blue (R,G,B) may be buffered in a buffer 412 and is then subject to color and other image processing such as gamma correction 414. When the image data is in the form of one color system there is a need to convert the color image data to a different color system by a color transformation operation 416. The transformed color separation image data normally used with a printer is preferably C,Y,M,K. As noted above, the color transformation processor may be provided with under color removal and/or gray component replacement as is well known. The function of under color removal is mainly to reduce chromatic color (yellow, magenta and cyan) in the dark or near-neutral shadow areas in order to reduce toner height or toner coverage. Gray component replacement is similar but refers to use of black toner for the gray component of any color and is not restricted as is under color removal to the near-neutral color area. Although the purpose of these two techniques are different, in reality they are similar in terms of employing black toner to reduce some of the chromatic toners from the image. With reference now to FIGS. 20 (*a*) and (*b*), there is provided an example of GCR and UCR with a brown mixed color. The GCR function permits the gray component of the chromatic printing inks or toners to be replaced by black process color, with an effect in the entire color space. The amount replaced can be set as desired. The color impression remains the same. Less color is needed to create a specific hue, i.e., the area is reduced. This means that the gray axis is more stable. Since fewer chromatic colors are used, cost can be reduced. UCR is an additional or optional setting option in chromatic reproduction. In this process, the gray component of the chromatic printing inks or toners is replaced by black in neutral image shadow. Less color is needed to create a specific hue, i.e., the area is reduced. This means that the gray axis is more stable and fewer chromatic colors are used, cost can be reduced with UCR as well. Although it is known to provide a UCR and/or GCR processor after color space transformation, it is more preferable to provide for it during the color space transformation. A problem associated with employing UCR and/or GCR is that the most saturated color values produced by the processing may not reach the levels that would otherwise indicate that they represent binary data image information. For example, the threshold/detector 26 is provided with a certain preprogrammed threshold level values above the threshold level assumed to be binary information. If certain color transformation processes are employed in which all the process information falls below this preprogrammed threshold level, then all the information will be assumed to be a non-binary image data file and will be subject to bypass of the GRET processor. The operator of the printer will be aware of the color transformation processes being employed and can therefore through adjustment of the threshold input to the GRET adjustable threshold/detector 26 provide for a new threshold level taking into account what will substantially be considered a useful threshold above which would indicate a binary image data file. For example, typically a binary image file might be represented by saturated color gray values in an 8-bit depth system wherein the gray values are considered to be 254 or 255. Thus, a threshold value of 253 might be established in the threshold/detector 26. However, particularly where UCR and/or GCR are employed, maximum gray values may be no more than 253. The indication would, thus, be that no binary image data file is present and selection would be made of only data that has bypassed the GRET processor. However, this result belies the nature of the image information because of the nature of the processing in the color transformation. In order to overcome this problem, the operator is provided an opportunity through a programmed adjustable threshold input to establish a new threshold for determining what is defined to be a binary image data file so that improved control is now provided between which image data will be subject to selection either data that has bypassed the GRET processor or image data which is subject to GRET processing. Thus, for example, where UCR and/or GCR are employed the operator would establish a lower threshold than say 253 for the GRET threshold/detector 26 in order to be sure that some of the information selected for output would be that from the GRET processing. Alternatively, a lower threshold may be established by altering the threshold value automatically upon selection by the operator of under color removal and/or gray component replacement or an adjustment in the amount of under color removal and/or gray component replacement.

The raw scanned image data may be subject also to other corrections as is well known in the prior art. Input from an electronic data source 420 may also be provided of pages of image data that may also be input to a job image buffer 424 after rasterization by a raster image processor (RIP) 422. One or more pages of rasterized image data from the scanner or the electronic data source are stored in the job image buffer (JIB), preferably in compressed form, allowing collated sets of multipage documents to be printed by electronically recirculating the image data in the job image buffer after the data has been sent to the printer. In this regard reference may be had to U.S. Pat. No. 5,047,955 filed in the name of Shope et al, the contents of which are incorporated herein by reference. The image data is output to an image processing system 10 described above for ultimate output to a gray level printhead or display 470. The printhead may be provided with correction by a writer interface board 460 for correcting for nonuniformities of the recording elements or other known correction devices or schemes such as those which adjust exposure level through pulse-width modulation, pulse intensity modulation, etc. In this regard reference is made to U.S. Pat. No. 6,021,256, filed in the name of Ng et al, and U.S. Pat. No. 5,914,744, filed in the name of Ng. Overall control of the apparatus may be provided by marking engine controller 426 that may be in the form of one or more microcomputers suitably programmed to provide the control in accordance with well-known programming skills. A workstation WS provides input to the marking engine controller of various job parameters relative to the printing job, such as number of copies, paper selection, etc., including the GRET adjustable threshold input value used by the detector 26, GRET strength selection (high, medium, low LUT) and the real-time color tweaking adjustment used in LUT 12.

In the preferred apparatus of the invention the printhead of say 600 dpi resolution exposes a uniformly charged photoconductive drum or web and the web is developed with pigmented electroscopic toner particles to develop the image. The developed image, as well as developed images of other color separations, are then transferred either serially in separate operations or in one operation to a receiver sheet either directly from the photoconductive web or drum or indirectly via an intermediate transfer member and in this regard reference is made to U.S. Pat. No. 6,075,965, issued in the name of Tombs et al, for description of a color electrophotographic machine for serially transferring color separation images to a receiver sheet.

Extension of this method includes storing more than one pictorial screen within one of the screeners, so different pictorial screens can be used within the printed page (or the next page without reloading the screener LUT). Of course, in this case one will need to store more than one set of screen addresses (in the Row and Column LUTs). Also a selector function at say the workstation WS of which pictorial screen to use will need to be included.

Other extensions on the subject include the usage of an irrational screen coordinate calculator (the errors for screen angle and frequency calculation can be propagated forward, so adjustment of subsequent screen blocks can be done to correct for those errors), such that irrational screens can be used and one can obtain more choices of accurate screen angles and frequencies using this method with a lower addressability output device. In more detail, the screen coordinate calculator calculates the LUT data addresses for each step through the screen brick, and accumulates a position error due to stepping through the brick. This position error is corrected by making address jumps when a pre-defined position error threshold is exceeded.

There has thus been described an improved apparatus and method for rendering of gray level image data through direct lookup table determination of rendering halftone values.

The invention has been described with reference to certain preferred embodiment thereof. It will be understood, however, and modifications and variations can be made within the scope of the appended claims.

What is claimed is:

1. A method for processing input image data, the method comprising the steps of:
    receiving image data that includes data representing a plurality of pixels, wherein each pixel of the plurality of pixels is associated with a location and one of at least three intensities;
    accessing data in a memory, the data representing a screen, the screen including a plurality of planes, each plane of the plurality of planes including a plurality of cells, wherein each cell of the plurality of cells is associated with one of at least three microdot densities, the microdot densities being representative of a particular dot size capable of being printed by a gray-level printer;
    for each pixel ("current pixel") of the plurality of pixels:
        determining the intensity and the location of the current pixel, selecting one of the plurality of planes based at least upon the current pixel's intensity, and associating one of the plurality of microdot densities in the selected plane with the current pixel based at least upon the current pixel's location;
    outputting the microdot densities associated with the plurality of pixels as first gray-level data;
    blending the first gray-level data with second gray-level data resulting in blended-gray-level data, wherein the blending weights the first gray-level data and the second gray-level data depending upon characteristics of the image data;

performing edge enhancement on portions of the blended-gray-level data that include text or high-contrast-edge data, thereby resulting in enhanced-blended-gray-level data; and outputting the enhanced-blended-gray-level data.

2. The method of claim 1, wherein the screen is a multilevel stochastic screen.

3. The method of claim 1, wherein the screen is a halftone screen.

4. The method of claim 1, wherein the blending step only blends midtone, high-contrast, or midtone and high-contrast regions of an image.

5. The method of claim 1, wherein the first gray-level data and the second gray-level data are color matched, structure matched, density matched, or combinations thereof.

6. An image processing apparatus comprising:

a memory storing data representing a screen, the screen including a plurality of planes, each plane of the plurality of planes including a plurality of cells, wherein each cell of the plurality of cells is associated with one of at least three microdot densities, the microdot densities being representative of a particular dot size capable of being printed by a gray level printer;

a first circuit configured at least to:
   receive image data that includes data representing a plurality of pixels, wherein each pixel of the plurality of pixels is associated with a location and one of at least three intensities, and
   for each pixel ("current pixel") of the plurality of pixels: determine the intensity and the location of the current pixel, select one of the plurality of planes based at least upon the current pixel's intensity, associate one of the plurality of microdot densities in the selected plane with the current pixel based at least upon the current pixel's location, and output the microdot densities associated with the plurality of pixels as first gray-level data;

a second circuit configured at least to receive the image data and output second gray-level data;

a blending circuit communicatively connected to the first circuit and the second circuit and configured at least to blend the first gray-level data with the second gray-level data, thereby resulting in blended-gray-level data, wherein the blending performed by the blending circuit weights the first gray-level data and the second gray-level data depending upon characteristics of the image data;

an edge enhancement circuit communicatively connected to the blending circuit and configured at least to perform edge enhancement on portions of the blended-gray-level data that include text or high-contrast-edge data, thereby resulting in enhanced-blended-gray-level data; and an output circuit communicatively connected to the edge enhancement circuit and configured at least to output the enhanced-blended-gray-level data.

7. The apparatus of claim 6, wherein the screen is a multilevel stochastic screen.

8. The apparatus of claim 6, wherein the screen is a halftone screen.

9. The apparatus of claim 6, wherein the blending circuit only blends midtone, high-contrast, or midtone and high-contrast regions of an image.

10. The apparatus of claim 6, wherein the first gray-level data and the second gray-level data are color matched, structure matched, density matched, or combinations thereof.

* * * * *